(12) United States Patent
Kissell

(10) Patent No.: US 7,376,954 B2
(45) Date of Patent: May 20, 2008

(54) MECHANISMS FOR ASSURING QUALITY OF SERVICE FOR PROGRAMS EXECUTING ON A MULTITHREADED PROCESSOR

(75) Inventor: Kevin D. Kissell, Le Bar sur Loup (FR)

(73) Assignee: MIPS Technologies, Inc., Mountain View, CA (US)

( * ) Notice: Subject to any disclaimer, the term of this patent is extended or adjusted under 35 U.S.C. 154(b) by 874 days.

(21) Appl. No.: 10/684,350

(22) Filed: Oct. 10, 2003

(65) Prior Publication Data

US 2005/0050395 A1    Mar. 3, 2005

Related U.S. Application Data

(60) Provisional application No. 60/502,359, filed on Sep. 12, 2003, provisional application No. 60/502,358, filed on Sep. 12, 2003, provisional application No. 60/449,180, filed on Aug. 28, 2003.

(51) Int. Cl.
*G06F 9/46* (2006.01)
*G06F 9/30* (2006.01)
*G06F 9/40* (2006.01)
*G06F 15/00* (2006.01)

(52) U.S. Cl. ............. 718/107; 712/214; 718/104
(58) Field of Classification Search ........... 710/49; 712/245, 214; 718/102, 104, 107
See application file for complete search history.

(56) References Cited

U.S. PATENT DOCUMENTS

| | | | |
|---|---|---|---|
| 4,817,051 A | 3/1989 | Chang | |
| 4,860,190 A * | 8/1989 | Kaneda et al. | 710/49 |
| 5,159,686 A | 10/1992 | Chastain et al. | |
| 5,499,349 A | 3/1996 | Nikhil et al. | |
| 5,511,192 A | 4/1996 | Shirakihara | |
| 5,515,538 A | 5/1996 | Kleiman | |
| 5,659,786 A | 8/1997 | George et al. | |
| 5,758,142 A | 5/1998 | McFarling et al. | |
| 5,812,811 A | 9/1998 | Dubey et al. | |

(Continued)

FOREIGN PATENT DOCUMENTS

EP    0725334 A1    8/1996

(Continued)

OTHER PUBLICATIONS

Heuring, Vincent P. and Jordan, Harry F. "Computer Systems and Architecture." Reading, Mass.: Addison Wesley Longman, Inc., © 1997, pp. 35-37.

(Continued)

*Primary Examiner*—Meng-Al T. An
*Assistant Examiner*—Eric C Wai
(74) *Attorney, Agent, or Firm*—Donald R. Boys; James W. Huffman

(57) ABSTRACT

A mechanism for assuring quality of service for a context in a digital processor has a first scheduling register dedicated to the context, the register having N out of M bits set, and a first scheduler that consults the register to assign issue slots to the context. The first scheduler grants issue slots for the context by referencing the N bits in the first register, and repeats a pattern of assignments of issue slots after referencing the M bits of the first register.

37 Claims, 34 Drawing Sheets

U.S. PATENT DOCUMENTS

| | | | |
|---|---|---|---|
| 5,867,704 | A | 2/1999 | Tanaka et al. |
| 5,892,934 | A | 4/1999 | Yard |
| 5,933,627 | A | 8/1999 | Parady |
| 5,944,816 | A | 8/1999 | Dutton et al. |
| 5,949,994 | A | 9/1999 | Dupree et al. |
| 5,961,584 | A | 10/1999 | Wolf |
| 6,061,710 | A | 5/2000 | Eickemeyer et al. |
| 6,088,787 | A | 7/2000 | Predko |
| 6,175,916 | B1 | 1/2001 | Ginsberg et al. |
| 6,189,093 | B1 | 2/2001 | Ekner et al. |
| 6,223,228 | B1 | 4/2001 | Ryan et al. |
| 6,330,656 | B1 | 12/2001 | Bealkowski et al. |
| 6,330,661 | B1 | 12/2001 | Torii |
| 6,401,155 | B1 | 6/2002 | Saville et al. |
| 6,675,192 | B2 | 1/2004 | Emer et al. |
| 6,687,812 | B1 | 2/2004 | Shimada |
| 6,697,935 | B1 | 2/2004 | Borkenhagen et al. |
| 6,877,083 | B2 | 4/2005 | Arimilli et al. |
| 6,889,319 | B1 | 5/2005 | Rodgers et al. |
| 6,971,103 | B2 | 11/2005 | Hokenek et al. |
| 6,986,140 | B2 | 1/2006 | Brenner et al. |
| 6,993,598 | B2 | 1/2006 | Pafumi et al. |
| 7,069,421 | B1 | 6/2006 | Yates, Jr. et al. |
| 7,127,561 | B2 | 10/2006 | Hill et al. |
| 7,134,124 | B2 | 11/2006 | Ohsawa et al. |
| 7,185,185 | B2 | 2/2007 | Joy et al. |
| 2002/0103847 | A1 | 8/2002 | Potash |
| 2002/0147760 | A1 | 10/2002 | Toril |
| 2003/0014471 | A1 | 1/2003 | Ohsawa et al. |
| 2003/0074545 | A1 | 4/2003 | Uhler |
| 2003/0079094 | A1 | 4/2003 | Rajwar et al. |
| 2003/0115245 | A1 | 6/2003 | Fujisawa |
| 2003/0126416 | A1 | 7/2003 | Marr et al. |
| 2004/0015684 | A1* | 1/2004 | Peterson ..................... 712/245 |
| 2005/0120194 | A1 | 6/2005 | Kissell |
| 2005/0125629 | A1 | 6/2005 | Kissell |
| 2005/0125795 | A1 | 6/2005 | Kissell |
| 2005/0240936 | A1 | 10/2005 | Jones et al. |
| 2005/0251613 | A1 | 11/2005 | Kissell |
| 2005/0251839 | A1 | 11/2005 | Vishin et al. |

FOREIGN PATENT DOCUMENTS

| | | |
|---|---|---|
| EP | 0917057 A2 | 5/1999 |
| EP | 1089173 A2 | 4/2001 |
| WO | WO0153935 A1 | 7/2001 |

OTHER PUBLICATIONS

Patterson et al. "Computer Organization & Design: The Hardware/Software Interface." 1998. Morgan Kaufmann Publishers, Inc. Second Edition. pp. 592-593.

Silberschatz et al. "Operating Systems Concepts." 1994. Addison-Wesley Publishing Company. Fourth Edition. pp. 267-269, 271-272, 275.

Kissell, Kevin D. "Microprocessor Forum (MPF) Conference Program Presentation: Architectural Extensions to the MIPS Architecture for High-Performance Embedded Systems." Oct. 15, 2003.

(webpage) Cray MTA-2 Historical Technical Papers, http://www.cray.com/products/programs/mta_2/resources.html. (Mar. 12, 2005), (formerly http://www.cray.com/products/systems/mta/psdocs.html (Jul. 2, 2004)).

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX. Mar. 1999.

Smith, Burton. "From Here to Petaflops." Keynote Address, Petaflops-systems Operations Working Review, (POWR), Bodega Bay, California, Jun. 1998.

Briggs, Preston. "Tuning the BLAS for the Tera." Workshop on Multithreaded Execution, Architecture and Compilation. (MTEAC 98), Jan. 1998.

Alverson, Gail et al., "Scheduling on the Tera MTA." IPPS '95 Workshop on Job Scheduling Strategies for Parallel Processing, Santa Barbara, CA, Apr. 1995, and in D.G.Feitelson and L. Rudolph, editors, Job Scheduling Strategies for Parallel Processing, Lecture Notes in Computer Science vol. 949, pp. 19-44, Springer-Verlag 1995.

Smith, Burton. "Folklore and Reality in High Performance Computing Slide Presentation." 1995.

Smith, Burton. "The Quest for General-Purpose Parallel Computing." 1994.

Alverson, Gail et al. "Exploiting Heterogeneous Parallelism on a Multithreaded Multiprocessor." 6th ACM International Conference on Supercomputing, Washington DC, Jul. 1992.

Callahan, David. "Recognizing and Parallelizing Bounded Recurrences." Fourth Workshop on Languages and Compilers for Parallel Computing. pp. 169-184. Aug. 1991.

Callahan, David et al. "Register Allocation via Hierarchical Graph Coloring." ACM Sigplan '91 Conference on Programming Language Design and Implementation, Jun. 1991.

Alverson, Robert. "Integer Division Using Reciprocals." 10th IEEE Symposium on Computer Arithmetic, Jun. 1991.

Callahan, David et al. "Improving Register Allocation for Subscripted Variables." ACM Sigplan Conference on Programming Language Design and Implementation, Jun. 1990.

Alverson, Robert et al. "The Tera Computer System." ACM International Conference on Supercomputing, pp. 1-6, Jun. 1990.

Smith, Burton. "The End of Architecture." Keynote Address, 17th Annual Symposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." retrieved from URL: http://catfish.csail.mit.edu/alewife/ on Jul. 2, 2004.

Arvind and R.A. Innaucci. "Two Fundamental Issues in Multiprocessing." In Proc. Of DFVLF-Conf. 1987 on Par.Proc.in Science and Eng., Bonn-Bad Godesberg, W. Germany, Jun. 1987.

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," Euro-Par 2000 Parallel Processing. 6th International Euro-Par Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit Im Prozessor," Electronik, Franzis Verlag GmbH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, Implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Unger et al., "Utilising Parallel Resources By Speculation," Parallel and Distributed Processing, 1999. PDP '99. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

UBICOM, Inc. A Next Generation Packet Processor for Wireless Networking. Apr. 15, 2003. UBICOM, Inc. Mountain View, CA, USA.

Bolychevsky et al. "Dynamic Scheduling in RISC Architectures." IEEE Proceedings Computers and Digital Techniques, vol. 143, No. 5. Sep. 24, 1996. pp. 309-317.

Alverson et al., "Tera Hardware-Software Cooperation," Tera Computer Corporation—Proceedings of the IEEE/ACM SC97 Conference—Nov. 15-21, 1997, San Jose, CA.

Carter et al., "Performance and Programming Experience on the Tera MTA," Tera Computer Corporation—SIAM Conference on Parallel Processing—Mar. 1999.

"Multithreaded Programming Guide," Nov. 1995, Sunsoft Microsystems, Inc., Mountain View, CA, USA.

"Hyper-Threading Technology," vol. 6, Issue 01, Published Feb. 14, 2002 ISSN 1535766X, Intel Technology Journal, USA.

Theo Ungerer, University of Augsburg, Augsburg Germany; Borut Robic, University of Ljubljana, Slovenia; Jurij Silc, Jozef Stefan Institute, Slovenia. "Multithreaded Program Guide", Nov. 1995. Sunsoft, A Sun Microsystems, Inc. Business, 2550 Garcia Ave., Mountain View, CA, 94043, USA.

Theo Ungerer, University of Augsburg, Augsburg,Germany; Borut Robic, University of Ljubljana, Slovenia; Jurij Silc, Jozef Stefan Institute, Slovenia. "A Survey of Processors with Explicit Multithreading". ACM Computing Surveys, vol. 35, No. 1, Mar. 2003, pp. 29-63.

David Fotland; "A Multithreaded Wireless Network Processor with Software I/O". Embedded Processor Forum, Jun. 18, 2003. In-Stat MDR;www.MDRonline.com.

Ubicom, Inc., A Next-Generation Packet Processor for Wireless Networking, Apr. 15, 2003, Ubicom, Inc., Mountain View, CA, USA.

SunSoft, Mutlithreaded Programming Guide, 1995, SunSoft, A Sun Microsystems, Inc. Business, Mountain View, CA USA.

Sunsoft. Multithreaded Programming Guide. 1994. Sunsoft, A Sun Microsystems, Inc. Business. Mountainview, CA. pp. 6, 12-13, 22-34 and 87.

Sunsoft. Multithreaded Programming Guide. 1995. Sunsoft, A Sun Microsystems, Inc. Business. Mountainview, CA.

Hennessy, John L. et al. "Computer Architecture A Quantitative Approach." Second Edition. San Francisco, CA: Morgan Kaufmann Publishers, Inc. 1996, pp. 70-73 and 87-89.

Zilles, Craig B. et al. "The Use of Multithreading for Exception Handling." *micro*, p. 219. 32nd Annual International Symposium on Microarchitecture.

Dorai, Gautham K. et al. "Transparent Threads: Resource Sharing in SMT Processors for High Single-Thread Performance." Proceedings of the International Conference on Parallel Architectures and Compilation Techniques 2002.

\* cited by examiner

| Contents of GPR rs | Thread Scheduling Enable Condition |
| --- | --- |
| MSB:16 | Reserved. UNPREDICTABLE behavior if non-zero |
| 15 | IP7 Interrupt Asserted |
| 14 | IP6 Interrupt Asserted |
| 13 | IP5 Interrupt Asserted |
| 12 | IP4 Interrupt Asserted |
| 11 | IP3 Interrupt Asserted |
| 10 | IP2 Interrupt Asserted |
| 9 | IP1 Interrupt Asserted |
| 8 | IP0 Interrupt Asserted |
| 7 | Load-Linked Condition Clear |
| 6 | Load-Linked Condition Set |
| 5 | System Dependent External Event 3 |
| 4 | System Dependent External Event 2 |
| 3 | System Dependent External Event 1 |
| 2 | System Dependent External Event 0 |
| 1 | Reserved. UNPREDICTABLE behavior if non-zero |
| 0 | Enabled on Next Cycle |

*Fig. 7*

| u value | sel value | Register Selected |
|---|---|---|
| 0 | n | Coprocessor 0 Register number rt, sel = sel |
| 1 | 0 | GPR[rt] |
| 1 | 1 | If rt = 0, Lo Register<br>If rt = 1, Hi Register<br>If rt = 2, ACX Register<br>Other Values of rt, Reserved, Unpredictable |
| 1 | 2 | FPR[rt] |
| 1 | 3 | FPCR[rt] |
| 1 | 4 | Cop2 Data[rt] |
| 1 | 5 | Cop2 Control [rt] |
| 1 | >5 | Reserved, Unpredictable |

*Fig. 9*

| Register Name | New or Modified | CP0 Register Number | Register Select Number | Description |
|---|---|---|---|---|
| ThreadContext | New | 4 | 1 | Per Thread Read/Write Storage for OS use |
| ThreadConfig | New | 6 | 1 | Per-VPE register containing relatively non-volatile thread configuration data |
| ThreadSchedule | New | 6 | 2 | Optional per-thread register to assign issue bandwidth within VPE |
| VPESchedule | New | 6 | 3 | Optional per-VPE register to assign issue bandwidth within a processor |
| ThreadControl | New | 7 | 1 | Per-VPE register containing relatively volatile thread configuration data |
| ThreadStatus | New | 12 | 4 | Per-thread status information, includes copies of thread-specific bits of Status and EntryHi registers |
| Config4 | New | 16 | 4 | Per-processor configuration information on thread and VPE-related resources |
| Status | Modified | 12 | 0 | Additions to CU3-CU1 semantics |
| Cause | Modified | 13 | 0 | New cause code |
| EntryLo | Modified | 2,3 | 0 | Previously reserved cache attribute assigned |
| Config3 | Modified | 16 | 3 | Fields added to describe thread-related resource config |
| EBase | Modified | 15 | 1 | Previously reserved bit used to inhibit VPE with corresponding CPUNum value |
| SRSCtl | Modified | 12 | 2 | Previously hard-wired field now Soft and a function the ThreadConfig register |

| Fields | | Description | Read/ Write | Reset State | Fork State |
|---|---|---|---|---|---|
| Name | Bits | | | | |
| TCU (TCU3..TCU0) | 31..28 | Controls access and binding of threads to coprocessors 3, 2, 1, and 0 respectively. Status CU3..CU0 are identical to ThreadStatus TCU3..TCU0 of the thread refrencing status. The modification of either must bevisible in both. | R/W | 0 | 0 |
| TU | 15 | Thread underflow indication. Set by hardware in conjunction with a Thread Exception being raised in the case of a YIELD instruction that would deallocate the last allocated thread on a VPE. Cleared by any other Thread Exception. | R/W | 0 | 0 |
| H | 14 | Thread halted. When set, the associated thread has been halted and cannot be allocated, activated or scheduled. | R/W | 0 | 0 |
| A | 13 | Thread activated. Set automatically when a FORK instructioin allocates the thread context, and cleared automatically when a YIELD $0 instruction deallocated it. | R/W | #1 | 1 |
| TKSU | 12..11 | Defined as per the Status register KSU field. This is the per-thread Kernel/Supervisor/User state. Status.KSU is identical to ThreadStatus. TKSU of the thread referencing status. The modification of either must be visible in both. | R/W | #2 | #3 |
| IXMT | 10 | Interrupt Exempt. If set, thread will not take asynchronous exceptions such as interrupts. | R/W | 0 | 0 |
| TASID | 7:0 | Defined as per the EntryHi register ASID field. This is the per thread ASID value. EntryHi.ASID is identical to ThreadStatus.TASID of the thread referencing EntryHi. The modification of either must be visible in both. | R/W | #2 | #3 |
| 0 | 31:16 10:8 | Must be written as 0. Return 0 on read. | 0 | 0 | 0 |

1 - 1 for default/reset thread, 0 for all others  #3 - copied from forking thread
2 - undefined

*Fig. 19*

| Fields | | Description | Read/ Write | Reset State |
|---|---|---|---|---|
| Name | Bits | | | |
| M | 31 | This bit is reserved to indicate that a Config5 register is present | R | Preset |
| 0 | 30 | Reserved. Reads as 0. Must be written as 0. | R | Preset |
| C1M | 29 | Allocatable CP1 coprocessors are media-extension capabl. | R | Preset |
| C1F | 28 | Allocatable CP1 coprocessors are floating-point capable. | R | Preset |
| ITCP | 27 | If set, ITC locations per page is configuarable. Otherwise Config3.NITC_PLocs is fixed. | R | Preset |
| PITCL | 26:19 | Log2 of total processor compliment of ITC storage locations | R | Preset |
| PTLBE | 18:13 | Log2 of total procesor compliment of TLB entry pairs | R | Preset |
| PCOP2 | 12:10 | Log2 of total processor compliment of integrated and allocatable Coprocessor 2's | R | Preset |
| PCOP1 | 9:7 | Log2 of total processor compliment of integrated and allocatable FP/MDMX Coprocessors. | R | Preset |
| PThreads | 6:3 | Log2 of total processor compliment of Thread contexts | R | Preset |
| PVPE | 2:0 | Log2 of total processor compliment of VPE contexts | | |

*Fig. 26*

| C( 5:3 ) Value | Cache Coferency Attribute |
|---|---|
| 7 | References to page resolved through ITC storage rather than the cache hierarchy. |

| Fields | | Description | Read/Write | Reset State |
|---|---|---|---|---|
| Name | Bits | | | |
| NITC_PLocs | 30:28 | Number of ITC Synchronization Locations per page of ITC Storage, encoded as Log2 of the number of locations per page.<br><br>2#000 = 1<br>2#001 = 2<br>2#010 = 4<br>2#011 = 8<br>2#100 = 16<br>2#101 = 32<br>2#110 = 64<br>2#111 = 127 | R | Preset |
| NITC_Pages | 27:16 | Number of ITC Pages Available to VPE | R | Preset |
| NThreads | 15:8 | Number of thread contexts available minus 1. If 0, no multithreading capability is implemented. | R | Preset |
| VPC | 3 | Indicates that processor is in a VPE Configuration State. Settable by software only if the MVP bit is set. | R/RW | 0 |
| MVP | 2 | Indicates that the processor has multiple VPE contexts that may be configured. If MVP is set, the adjacent VPC bit may be written by software to enable VPE configuration. MVP may be cleared by software while VPC is set, such that a subsequent ECONF instruction will latch the zero value and prevent further configuration until the next hard reset. | R/RW | Preset |

| Fields | | Description | Read/Write | Reset State |
|---|---|---|---|---|
| Name | Bits | | | |
| VPI | 30 | Virtual Processor Inhibit, if set, the virtual processor associated with the CPUNum value is inhibited from execution. If clear, VPE is started on ECONF. Thus the zero value necessary for direct software use as a base register is preserved for active VPE's. | R | Preset |

| Address Bits 4:3 Value | ITC Storage Behavior |
|---|---|
| 2#00 | Empty/Full Synchronized Storage Loads will cause the issueing thread to block if location is Empty, and reset the Empty state on returning a load value. Stores will cause the issueing thread to block if the location is Ful, and reset the full state on the location accepting a store value. |
| 2#01 | Force Empty/Full Loads/Stores do not block. Loads set Empty state. Stores set Full state, regardless of previous value. Load value returned is that of last value to the location (or unpredictable if never initialized). |
| 2#10 | Bypass Empty/Full Loads/Stores do not block, and do not affect Empty/Full. |
| 2#11 | Status Control Informaton |

| | Data Bit(s) | Meaning |
|---|---|---|
| | 0 | If set, location is empty, and will block on attempt to store as synchronized storage |
| | 1 | If set, location is Full and will block on an attempt to store as synchronized storage. |
| | 2 | Load-Blocked Thread indication. Value of 1 if a load has blocked on the location since the last setting of the Empty bit; 0 otherwise. |
| | 3 | Store-blocked Thread indication. Value of 1 if a store has bl;ocked on the location since the last setting of the Full bit. 0 otherwise. |
| | 63..4 | Implementation Dependent State. |

MECHANISMS FOR ASSURING QUALITY OF SERVICE FOR PROGRAMS EXECUTING ON A MULTITHREADED PROCESSOR

CROSS-REFERENCE TO RELATED APPLICATIONS

This application claims the benefit of
(1) U.S. Provisional Application No. 60/499,180, filed Aug. 28, 2003 and entitled, "Multithreading Application Specific Extension"
(2) U.S. Provisional Application No. 60/502,358, filed Sep. 12, 2003 and entitled, "Multithreading Application Specific Extension to a Processor Architecture", and
(3) U.S. Provisional Application No. 60/502,359, filed Sep. 12, 2003 and entitled, "Multithreading Application Specific Extension to a Processor Architecture", each of which is incorporated by reference in its entirety for all purposes.

This application is related to co-pending U.S. Non-Provisional Application No. 10/684,348, filed Oct. 10, 2003 and entitled "Integrated Mechanism for Suspension and Deallocation of Computational Threads of Execution in a Processor,", which is hereby incorporated by reference in its entirety for all purposes.

FIELD OF THE INVENTION

The present invention is in the area of digital processors (e.g., microprocessors, digital signal processors, microcontrollers, etc.), and pertains more particularly to apparatus and methods relating to managing execution of multiple threads in a single processor.

BACKGROUND OF THE INVENTION

In the realm of digital computing the history of development of computing power comprises steady advancement in many areas. Steady advances are made, for example, in device density for processors, interconnect technology, which influences speed of operation, ability to tolerate and use higher clock speeds, and much more. Another area that influences overall computing power is the area of parallel processing, which includes more than the parallel operation of multiple, separate processors.

The concept of parallel processing includes the ability to share tasks among multiple, separate processors, but also includes schemes for concurrent execution of multiple programs on single processors. This scheme is termed generally multithreading.

The concept of multithreading is explained as follows: As processor operating frequency increases, it becomes increasingly difficult to hide latencies inherent in the operation of a computer system. A high-end processor which misses in its data cache on 1% of the instructions in a given application could be stalled roughly 50% of the time if it has a 50-cycle latency to off-chip RAM. If instructions directed to a different application could be executed when the processor is stalled during a cache miss, the performance of the processor could be improved and some or all of the memory latency effectively hidden. For example, FIG. 1A shows a single instruction stream 101 that stalls upon experiencing a cache miss. The supporting machine can only execute a single thread or task at a time. In contrast, FIG. 1B shows instruction stream 102 that may be executed while stream 101 is stalled. In this case, the supporting machine can support two threads concurrently and thereby more efficiently utilize its resources.

More generally, individual computer instructions have specific semantics, such that different classes of instructions require different resources to perform the desired operation. Integer loads do not exploit the logic or registers of a floating-point unit, any more than register shifts require the resources of a load/store unit. No single instruction consumes all of a processor's resources, and the proportion of the total processor resources that is used by the average instruction diminishes as one adds more pipeline stages and parallel functional units to high-performance designs.

Multithreading arises in large measure from the notion that, if a single sequential program is fundamentally unable to make fully efficient use of a processor's resources, the processor should be able to share some of those resources among multiple concurrent threads of program execution. The result does not necessarily make any particular program execute more quickly—indeed, some multithreading schemes actually degrade the performance of a single thread of program execution—but it allows a collection of concurrent instruction streams to run in less time and/or on a smaller number of processors. This concept is illustrated in FIGS. 2A and 2B, which show single-threaded processor 210 and dual-threaded processor 250, respectively. Processor 210 supports single thread 212, which is shown utilizing load/store unit 214. If a miss occurs while accessing cache 216, processor 210 will stall (in accordance with FIG. 1A) until the missing data is retrieved. During this process, multiply/divide unit 218 remains idle and underutilized. However, processor 250 supports two threads; i.e., 212 and 262. So, if thread 212 stalls, processor 250 can concurrently utilize thread 262 and multiply/divide unit 218 thereby better utilizing its resources (in accordance with FIG. 1B).

Multithreading on a single processor can provide benefits beyond improved multitasking throughput, however. Binding program threads to critical events can reduce event response time, and thread-level parallelism can, in principle, be exploited within a single application program.

Several varieties of multithreading have been proposed. Among them are interleaved multithreading, which is a time-division multiplexed (TDM) scheme that switches from one thread to another on each instruction issued. This scheme imposes some degree of "fairness" in scheduling, but implementations which do static allocation of issue slots to threads generally limit the performance of a single program thread. Dynamic interleaving ameliorates this problem, but is more complex to implement.

Another multithreading scheme is blocked multithreading, which scheme issues consecutive instructions from a single program thread until some designated blocking event, such as a cache miss or a replay trap, for example, causes that thread to be suspended and another thread activated. Because blocked multithreading changes threads less frequently, its implementation can be simplified. On the other hand, blocking is less "fair" in scheduling threads. A single thread can monopolize the processor for a long time if it is lucky enough to find all of its data in the cache. Hybrid scheduling schemes that combine elements of blocked and interleaved multithreading have also been built and studied.

Still another form of multithreading is simultaneous multithreading, which is a scheme implemented on superscalar processors. In simultaneous multithreading instructions from different threads can be issued concurrently. Assume for example, a superscalar reduced instruction set computer (RISC), issuing up to two instructions per cycle, and a simultaneously multithreaded superscalar pipeline, issuing up to two instructions per cycle from either of the two threads. Those cycles where dependencies or stalls prevented full utilization of the processor by a single program thread are filled by issuing instructions for another thread.

Simultaneous multithreading is thus a very powerful technique for recovering lost efficiency in superscalar pipelines. It is also arguably the most complex multithreading system to implement, because more than one thread may be active on a given cycle, complicating the implementation of memory access protection, and so on. It is perhaps worth noting that the more perfectly pipelined the operation of a central processing unit (CPU) may be on a given workload, the less will be the potential gain of efficiency for a multithreading implementation.

Multithreading and multiprocessing are closely related. Indeed, one could argue that the difference is only one of degree: Whereas multiprocessors share only memory and/or connectivity, multithreaded processors share memory and/or connectivity, but also share instruction fetch and issue logic, and potentially other processor resources. In a single multithreaded processor, the various threads compete for issue slots and other resources, which limits parallelism. Some multithreaded programming and architectural models assume that new threads are assigned to distinct processors, to execute fully in parallel.

There are several distinct problems with the state-of-the-art multithreading solutions available at the time of submission of the present application. One of these is the treatment of real-time threads. Typically, real-time multimedia algorithms are run on dedicated processors/DSPs to ensure quality-of-service (QoS) and response time, and are not included in the mix of threads to be shared in a multithreading scheme, because one cannot easily guarantee that the real-time software will be executed in a timely manner.

What is clearly needed in this respect is a scheme and mechanism allowing one or more real-time threads or virtual processors to be guaranteed a specified proportion of instruction issue slots in a multithreaded processor, with a specified inter-instruction interval, such that the compute bandwidth and response time is well defined. If such a mechanism were available, threads with strict QoS requirements could be included in the multithreading mix. Moreover, real time threads (such as DSP-related threads) in such a system might be somehow exempted from taking interrupts, removing an important source of execution time variability. This sort of technology could well be critical to acceptance of DSP-enhanced RISC processors and cores as an alternative to the use of separate RISC and DSP cores in consumer multimedia applications.

Another distinct problem with state-of-the-art multithreading schemes at the time of filing the present application is in the creation and destruction of active threads in the processor. To support relatively fine-grained multithreading, it is desirable for parallel threads of program execution to be created and destroyed with the minimum possible overhead, and without intervention of an operating system being necessary, at least in usual cases. What is clearly needed in this respect is some sort of FORK (thread create) and JOIN (thread terminate) instructions. A separate problem exists for multi-threaded processors where the scheduling policy makes a thread run until it is blocked by some resource, and where a thread which has no resource blockage needs nevertheless to surrender the processor to some other thread. What is clearly needed in this respect is a distinct PAUSE or YIELD instruction.

SUMMARY OF THE INVENTION

It is a principle object of the present invention to bring quality of service (QoS) functionality to processors enabled to process multiple threads (multi-threading processors). In accordance with this object, in a preferred embodiment of the present invention a mechanism for assuring quality of service for a context in a digital processor is provided, comprising a first scheduling register dedicated to the context and having N out of M bits set, and a first scheduler that consults the register to assign issue slots to the context. The first scheduler grants issue slots for the context by referencing the N bits in the first register, and repeats a pattern of assignments of issue slots after referencing the M bits of the first register.

In a preferred embodiment granularity of scheduling is determined by adjusting the magnitude of M. Also in a preferred embodiment the number of N bits determines the proportion of issue slots assigned to the context. Still in a preferred embodiment there may further be a specific bit in a status register that, if set, exempts the context from processing any interrupt request.

In some embodiments the first scheduling register is thirty-two bits wide. Also in some embodiments the context is a virtual processing element (VPE) enabled on the digital processor. The context in some embodiments is a program thread.

In some embodiments of the invention the mechanism further comprises a thread disposed within the VPE, a second scheduling register dedicated to the thread, and a second scheduler that consults the second scheduling register to assign issue slots to the thread.

In another aspect of the invention a method for assuring quality of service for a context in a digital processor is provided, comprising (a) assigning a register as a scheduling register to the context, the register having M bits; (b) setting N bits of the register in a pattern desired for issuing instructions for the context; and (c) accessing the pattern of bits sequentially, assigning an issue slot to the context according to whether a bit is set or not set, and repeating after reaching the end of the pattern.

In a preferred embodiment of the in step (b) granularity of scheduling is adjusted by adjusting the magnitude of M. Also in a preferred embodiment in step (b) specific patterns of execution for the context are constrained by setting or not setting bits of the scheduling register in consecutive positions as blocks. In another embodiment there is further a step for assigning and setting a specific bit in a status register that, if set, exempts the context from processing any interrupt request.

In some embodiments the scheduling register is thirty-two bits wide. Also in some embodiments the context is a viral processing element (VPE) enabled on the digital processor. In some embodiments the context is a program thread.

In some embodiments of the method the digital processor supports multiple virtual processing elements (VPEs) and each VPE supports one or more program threads, the method comprising assigning at least one scheduling register to a VPE and assigning at least one other scheduling register to a program thread in the VPE.

In yet another aspect of the invention a digital processor for supporting and executing multiple contexts is provided, comprising one or more specific scheduling registers dedicated one-to-one with specific ones of the contexts, and having M bits set in a specific pattern for a scheduler to access bit-by-bit sequentially to grant issue slots to the contexts.

In a preferred embodiment granularity of scheduling is determined by adjusting the magnitude of M. Also in a preferred embodiment the number of bits set in an individual scheduling register compared to M determines the proportion of issue slots assigned to one of the multiple contexts, and setting bits of the scheduling register in consecutive positions as blocks allows repetitive block assignment of issue slots.

In some embodiments a specific bit in a status register is reserved for interrupt service, such that, if set, an associated context is exempted from servicing interrupt requests. Also in some embodiments one or more of the scheduling registers is thirty-two bits wide. In still other embodiments the processor is enabled to support one or more virtual processing elements (VPEs), and the contexts are VPEs.

In some embodiments the context is a program thread. Also in some embodiments the digital processor is enabled to support multiple virtual processing elements (VPEs) and each VPE is enabled to support one or more program threads, wherein individual ones of the scheduling registers associate with individual VPEs, and an individual one of the scheduling registers supports an individual program thread in a VPE.

In still another aspect of the invention a processing system for assuring quality of service for a context is provided, comprising at least one processor, a scheduling register accessible to the processor, dedicated to the context and having M bits set in a pattern, and a scheduler that consults the register to assign issue slots to the context. The scheduler schedules issue slots sequentially for the context associated with the register by accessing the pattern of bits in the register sequentially, and repeating when reaching the end of the pattern.

In some preferred embodiments of the invention granularity of scheduling is determined by adjusting the magnitude of M. Also in some preferred embodiments the number of bits set compared to M determines the proportion of execution slots assigned to the context, and setting bits of the scheduling register in consecutive positions as blocks allows repetitive block assignment of issue slots.

In some embodiments there is further a bus system communicating between the digital processor and one or more input/output (I/O) devices, and a specific bit in a status register that, if set, exempts the context from processing any interrupt request from one of the I/O devices. In some embodiments the scheduling register is thirty-two bits wide.

In still other embodiments the context is a virtual processing element (VPE) enabled on the at least one processor, and in yet other embodiments the context is a program thread. In some embodiments the at least one processor supports multiple virtual processing elements (VPEs) and each VPE supports one or more program threads, the mechanism further comprising at least one scheduling register dedicated to a VPE and at least one other scheduling register dedicated to a program thread in the VPE.

In still another aspect of the invention a digital storage medium having written thereon a software program code set executable on a digital processor, the code set comprising function code for reading sequentially bits of a register dedicated to a specific context and assigning issue slots to the associated specific context according to whether each bit is set or not set.

In some preferred embodiments of the medium there is further a function for recognizing one bit of a dedicated status register as a bit to exempt the associated context from servicing an interrupt request. In some embodiments the context is a virtual processing element (VPE), and in some embodiments the context is a program thread.

In embodiments of the invention taught in enabling detail below, for the first time robust Quality of Service functions are provided for scheduling contexts in a multithreading digital processor.

BRIEF DESCRIPTION OF THE DRAWING FIGURES

FIG. 7 is a table showing a 16-bit qualifier mask for GPR rs.

FIG. 9 is a table for interpreting fields of the MFTR instruction in an embodiment of the invention.

FIG. 15 is a table of system coprocessor privileged resources in an embodiment of the invention.

FIG. 19 is a table defining fields of the ThreadStatus register in an embodiment of the invention.

FIG. 26 is a table defining fields of the Config4 register in an embodiment of the invention.

FIG. 28 is a table defining ITC indicators.

FIG. 29 is a table defining Config3 register fields.

FIG. 31 is a table showing ITC storage behavior.

DESCRIPTION OF THE PREFERRED EMBODIMENTS

Figures 1A, 1B:
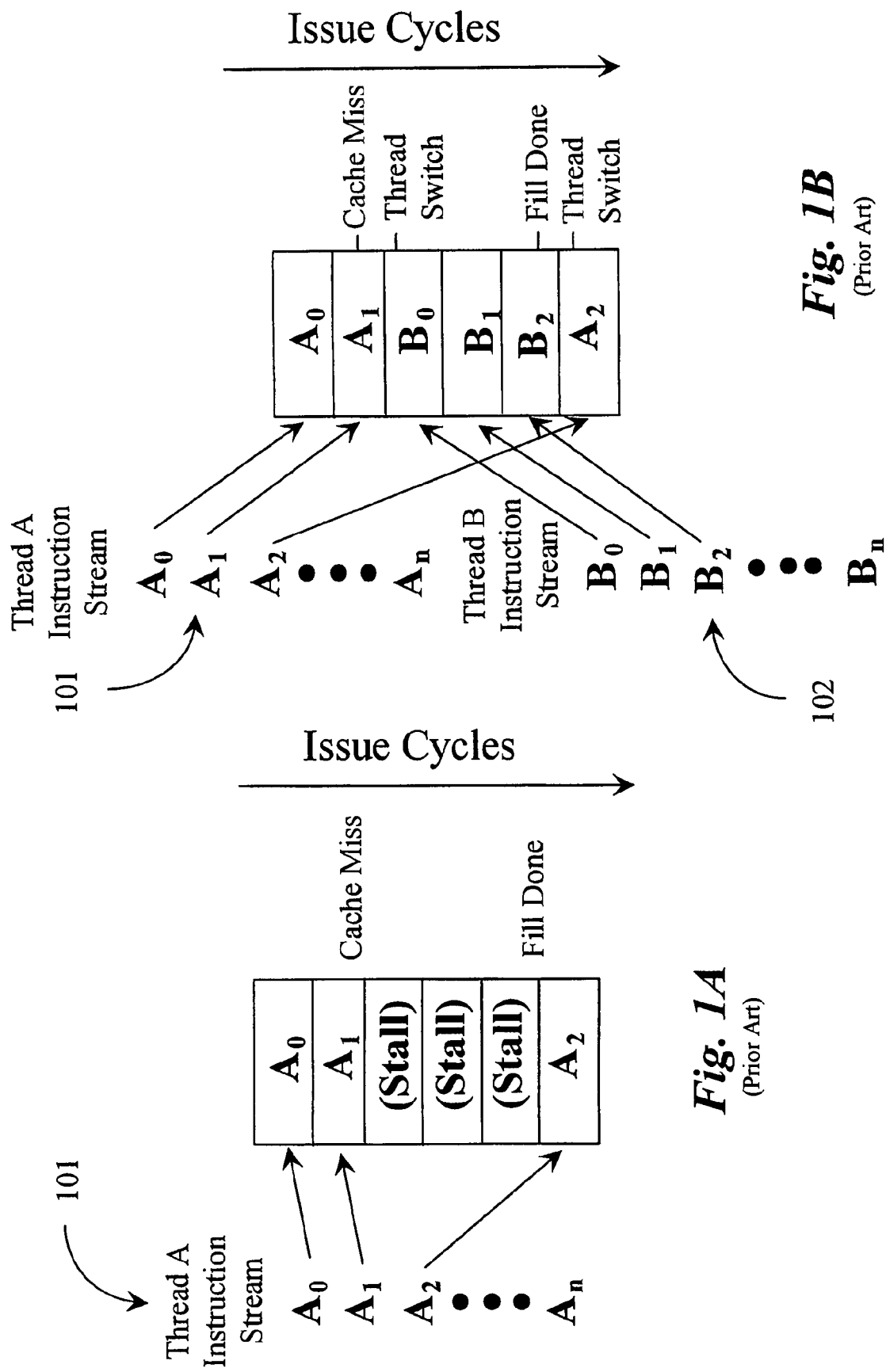
FIG. 1A is a diagram showing a single instruction stream that stalls upon experiencing a cache miss.
FIG. 1B is a diagram showing an instruction stream that may be executed while the stream of FIG. 1a is stalled.
Figure 2B:
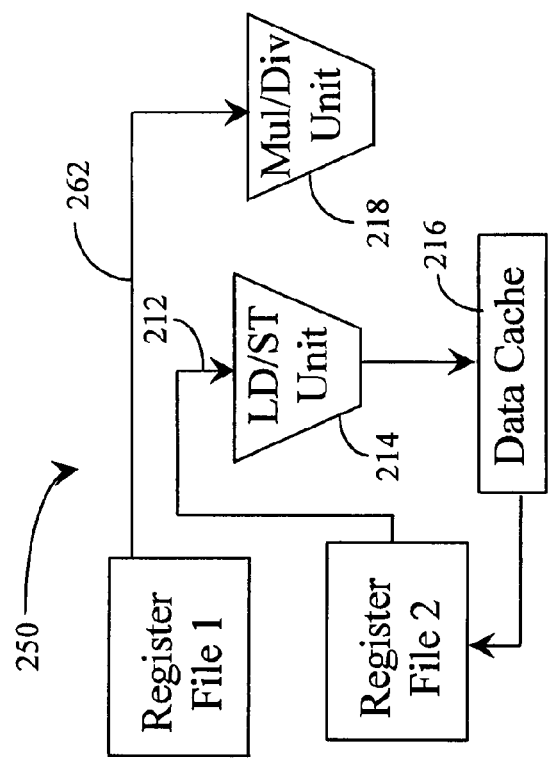
FIG. 2B is a diagram showing dual-threaded processor 250.
Figure 2A:
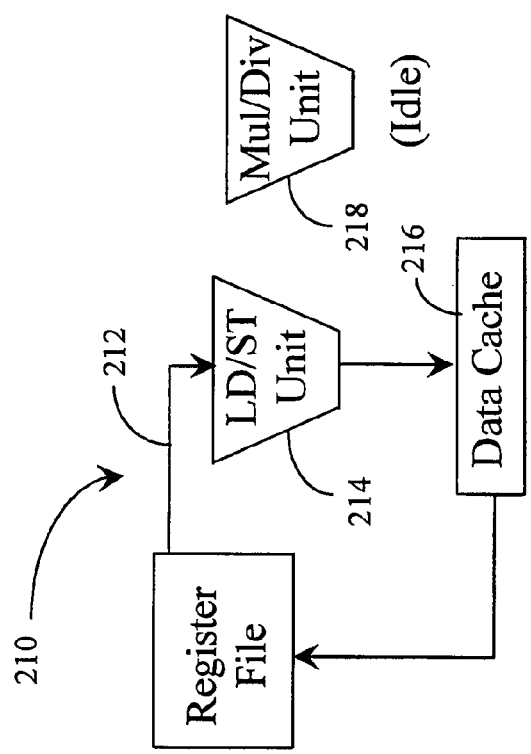
FIG. 2A is a diagram showing a single-threaded processor.

In one preferred embodiment of the present invention, a processor architecture includes an instruction set comprising features, functions and instructions enabling multithreading on a compatible processor. The invention is not limited to any particular processor architecture and instruction set, but for exemplary purposes the well-known MIPS architecture, instruction set, and processor technology (collectively, "MIPS technology") is referenced, and embodiments of the invention described in enabling detail below are described in context with MIPS technology. Additional information regarding MIPS technology (including documentation referenced below) is available from MIPS Technologies, Inc. (located in Mountain View Calif.) and on the Web at www.mips.com (the company's website).

The terms "processor" and "digital processor" as used herein are intended to mean any programmable device (e.g., microprocessor, microcontroller, digital signal processor, central processing unit, processor core, etc.) in hardware (e.g., application specific silicon chip, FPGA, etc.), software (e.g., hardware description language, C, C+, etc.) or any other instantiation (or combination) thereof.

The terms "thread" and "program thread" as used herein have the same meaning.

General Description

A "thread context" for purposes of description in embodiments of this invention is a collection of processor state necessary to describe the state of execution of an instruction stream in a processor. This state is typically reflected in the contents of processor registers. For example, in a processor that is compatible with the industry-standard MIPS32 and/or MIPS64 Instruction Set Architectures (a "MIPS Processor"), a thread context comprises a set of general purpose registers (GPRs), Hi/Lo multiplier result registers, some representation of a program counter (PC), and some associated privileged system control state. The system control state is retained in that portion of a MIPS Processor typically referred to as coprocessor zero ("CP0"), and is largely maintained by system control registers and (when used) a Translation Lookaside Buffer ("TLB"). In contrast, a "processor context" is a larger collection of processor state, which includes at least one thread context. Referring again to a MIPS Processor, a processor context in this case would include at least one thread context (as described above) as well as the CP0 and system state necessary to describe an intantiation of the well-known MIPS32 or MIPS64 Privileged Resource Architecture ("PRA"). (In brief, a PRA is a set of environments and capabilities upon which an instruction set architecture operates. The PRA provides the mechanisms necessary for an operating system to manage the resources of a processor; e.g., virtual memory, caches, exceptions and user contexts.)

In accordance with one embodiment of the present invention, a multithreading application-specific extension ("Multithreading ASE") to an instruction set architecture and PRA allows two distinct, but not mutually-exclusive, multithreading capabilities to be included within a given processor. First, a single processor can contain some number of processor contexts, each of which can operate as an independent processing element through the sharing of certain resources in the processor and supporting an instruction set architecture. These independent processing elements are referred to herein as Virtual Processing Elements ("VPEs"). To software, an N VPE processor looks exactly like an N-way symmetric multiprocessor ("SMP"). This allows existing SMP-capable operating systems to manage the set of VPEs, which transparently share the processor's execution units.

Figure 3:
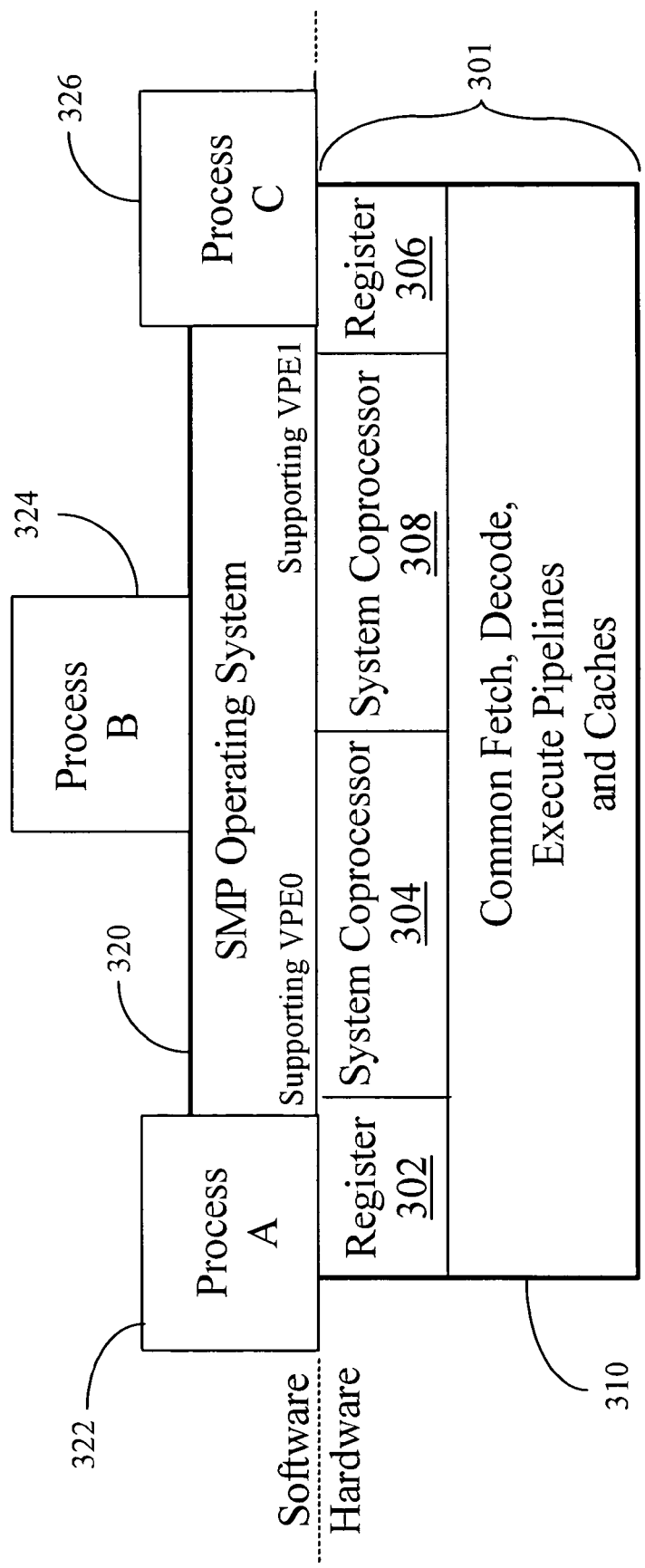
FIG. 3 is a diagram illustrating a processor supporting a first and a second VPE in an embodiment of the present invention.

FIG. 3 illustrates this capability with single processor 301 supporting a first VPE ("VPE0") that includes register state zero 302 and system coprocessor state zero 304. Processor 301 also supports a second VPE ("VPE1") that includes register state one 306 and system coprocessor state one 308. Those portions of processor 301 shared by VPE0 and VPE1 include fetch, decode, and execute pipelines, and caches 310. The SMP-capable operating system 320, which is shown running on processor 301, supports both VPE0 and VPE1. Software Process A 322 and Process C 326 are shown running separately on VPE0 and VPE1, respectively, as if they were running on two different processors. Process B 324 is queued and may run on either VPE0 or VPE1.

The second capability allowed by the Multithreading ASE is that each processor or VPE can also contain some number of thread contexts beyond the single thread context required by the base architecture. Multi-threaded VPEs require explicit operating system support, but with such support they provide a lightweight, fine-grained multithreaded programming model wherein threads can be created and destroyed without operating system intervention in typical cases, and where system service threads can be scheduled in response to external conditions (e.g., events, etc.) with zero interrupt latency.

Figure 4:
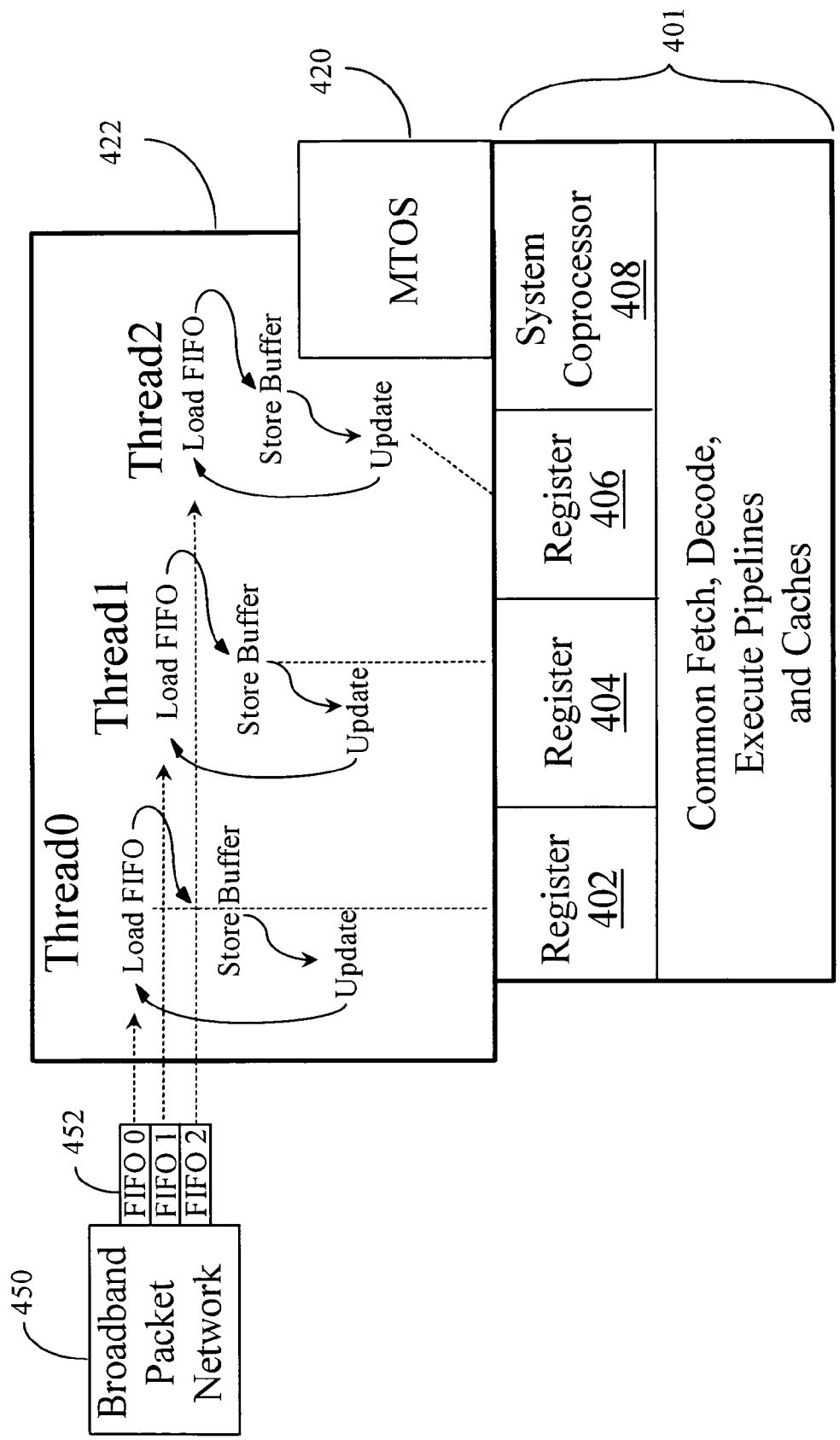
FIG. 4 is a diagram illustrating a processor supporting a single VPE which in turn supports three threads in an embodiment of the invention.

FIG. 4 illustrates this second capability with processor 401 supporting a single VPE that includes register state 402, 404 and 406 (supporting three threads 422), and system coprocessor state 408. Unlike FIG. 3, in this instance three threads are in a single application address space sharing CP0 resources (as well as hardware resources) on a single VPE. Also shown is a dedicated multithreading operating system 420. In this example, the multithreaded VPE is handling packets from a broadband network 450, where the packet load is spread across a bank of FIFOs 452 (each with a distinct address in the I/O memory space of the multithreaded VPE). The controlling application program creates as many threads as it has FIFOs to serve, and puts each thread into a tight loop reading the FIFOs.

A thread context may be in one of four states. It may be free, activated, halted, or wired. A free thread context has no valid content and cannot be scheduled to issue instructions. An activated thread context will be scheduled according to implemented policies to fetch and issue instructions from its program counter. A halted thread context has valid content, but is inhibited from fetching and issuing instructions. A wired thread context has been assigned to use as Shadow Register storage, which is to say that is held in reserve for the exclusive use of an exception handler, to avoid the overhead of saving and restoring register contexts in the handler. A free thread context is one that is neither activated, nor halted, nor wired. Only activated thread contexts may be scheduled. Only free thread contexts may be allocated to create new threads.

To allow for fine-grained synchronization of cooperating threads, an inter-thread communication ("ITC") memory space is created in virtual memory, with empty/full bit semantics to allow threads to be blocked on loads or stores until data has been produced or consumed by other threads.

Thread creation/destruction, and synchronization capabilities function without operating system intervention in the general case, but the resources they manipulate are all virtualizable via an operating system. This allows the execution of multithreaded programs with more virtual threads than there are thread contexts on a VPE, and for the migration of threads to balance load in multiprocessor systems.

At any particular point in its execution, a thread is bound to a particular thread context on a particular VPE. The index into that VPE's set of thread contexts provides a unique identifier at that point in time. But context switching and migration can cause a single sequential thread of execution to have a series of different thread indices, for example on a series of different VPEs.

Dynamic binding of thread contexts, TLB entries, and other resources to multiple VPEs on the same processor is performed in a special processor reset configuration state. Each VPE enters its reset vector exactly as if it were a separate processor.

Multithreaded Execution and Exception Model

The Multithreading ASE does not impose any particular implementation or scheduling model on the execution of parallel threads and VPEs. Scheduling may be round-robin, time-sliced to an arbitrary granularity, or simultaneous. An implementation must not, however, allow a blocked thread to monopolize any shared processor resource which could produce a hardware deadlock.

In a MIPS Processor, multiple threads executing on a single VPE all share the same system coprocessor (CP0), the same TLB and the same virtual address space. Each thread has an independent Kernel/Supervisor/User state for the purposes of instruction decode and memory access. When an exception is taken, all threads other than the one taking the exception are stopped and suspended until the EXL and ERL bits of the Status word are cleared, or, in the case of an EJTAG Debug exception, the Debug state is exited. The Status word resides in the status register, which is located in CP0. Details regarding the EXL and ERL bits as well as EJTAG debug exceptions may be found in the following two publications, each of which is available from MIPS Technologies, Inc. and hereby incorporated by reference in its entirety for all purposes: *MIPS32™ Architecture for Programmers Volume III: The MIPS32™ Privileged Resource Architecture*, Rev. 2.00, MIPS Technologies, Inc. (2003), and *MIPS64™ Architecture for Programmers Volume III: The MIPS64™ Privileged Resource Architecture*, Rev. 2.00, MIPS Technologies, Inc. (2003).

Exception handlers for synchronous exceptions caused by the execution of an instruction stream, such as TLB miss and floating-point exceptions, are executed by the thread executing the instruction stream in question. When an unmasked asynchronous exception, such as an interrupt, is raised to a VPE, it is implementation dependent which thread executes the exception handler.

Each exception is associated with a thread context, even if shadow register sets are used to run the exception handler. This associated thread context is the target of all RDPGPR and WRPGPR instructions executed by the exception handler. Details regarding the RDPGPR and WRPGPR instructions (used to access shadow registers) may be found in the following two publications, each of which is available from MIPS Technologies, Inc. and hereby incorporated by reference in its entirety for all purposes: *MIPS32™ Architecture for Programmers Volume II. The MIPS32™ Instruction Set*, Rev. 2.00, MIPS Technologies, Inc. (2003), and *MIPS64™ Architecture for Programmers Volume II: The MIPS64™ Instruction Set*, Rev. 2.00, MIPS Technologies, Inc. (2003).

The Multithreading ASE includes two exception conditions. The first of these is a Thread Unavailable condition, wherein a thread allocation request cannot be satisfied. The second is a Thread Underflow condition, wherein the termination and de-allocation of a thread leaves no threads allocated on a VPE. These two exception conditions are mapped to a single new Thread exception. They can be distinguished based on CP0 register bits set when the exception is raised.

Instructions

The Multithreading ASE in a preferred embodiment includes seven instructions. FORK and YIELD instructions control thread allocation, deallocation, and scheduling, and are available in all execution modes if implemented and enabled. MFTR and MTTR instructions are system coprocessor (Cop0) instructions available to privileged system software for managing thread state. A new EMT instruction and a new DMT instruction are privileged Cop0 instructions for enabling and disabling multithreaded operation of a VPE. Finally, a new ECONF instruction is a privileged Cop0 instruction to exit a special processor configuration state and re-initialize the processor.

FORK—Allocate and Schedule a New Thread

Figure 5:
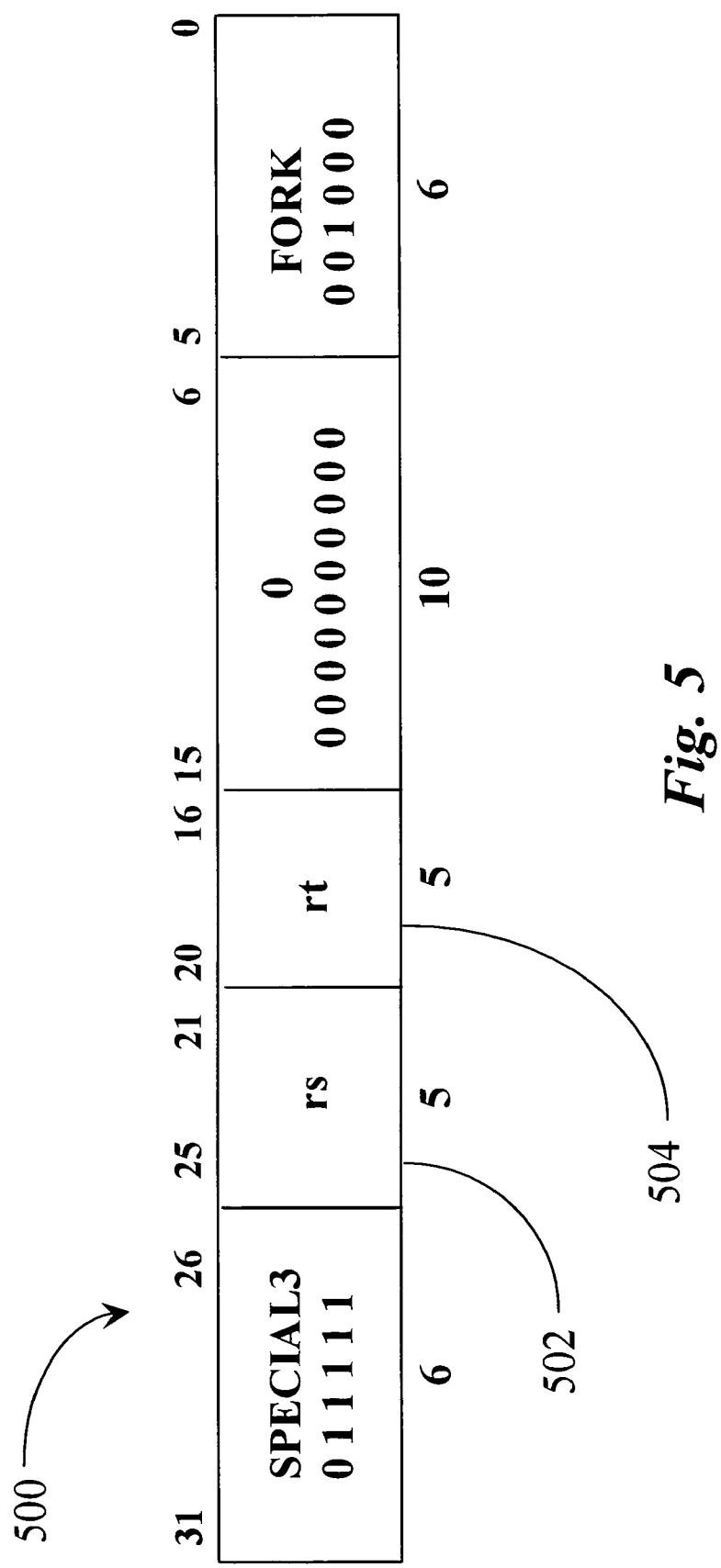
FIG. 5 shows format for a FORK instruction in an embodiment of the invention.
Figure 21:
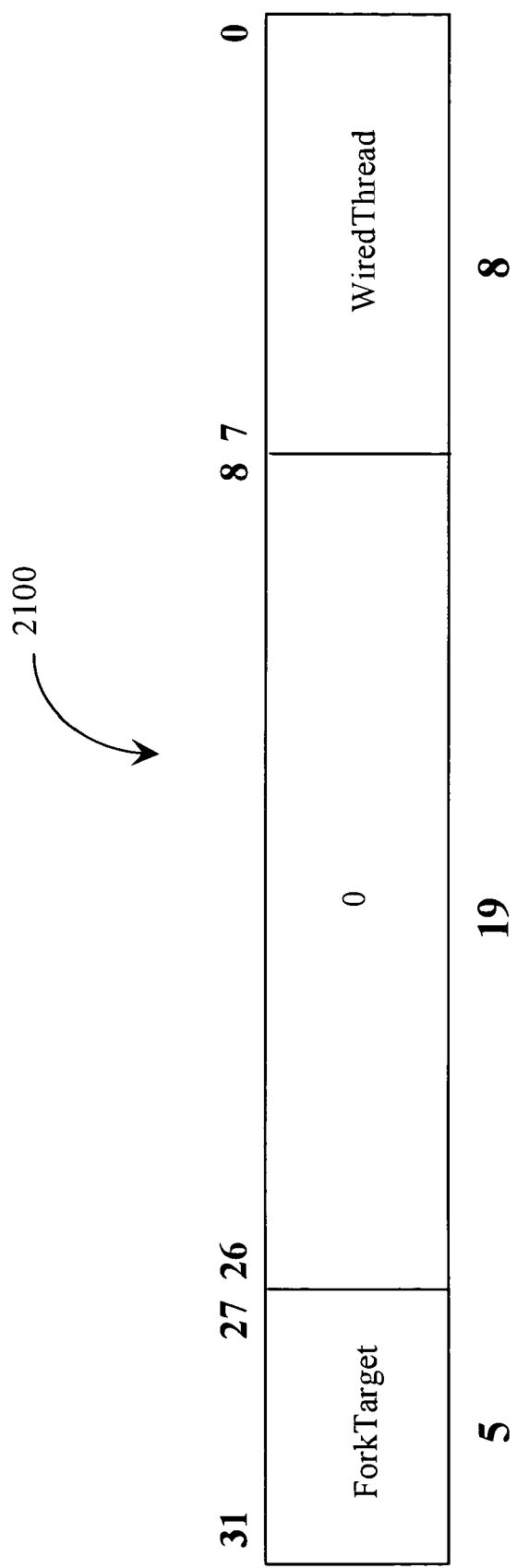
FIG. 21 shows layout of a ThreadConfig register in an embodiment of the invention.

The FORK instruction causes a free thread context to be allocated and activated. Its format 500 is shown in FIG. 5. The FORK instruction takes two operand values from GPRs identified in fields 502 (rs) and 504 (rt). The contents of GPR rs is used as the starting fetch and execution address for the new thread. The contents of GPR rt is a value to be transferred into a GPR of the new thread. The destination GPR is determined by the value of the ForkTarget field of the ThreadConfig register of CP0, which is shown in FIG. 21 and described below. The new thread's Kernel/Supervisor/User state is set to that of the FORKing thread. If no free thread context is available for the fork, a Thread Exception is raised for the FORK instruction.

YIELD—De-Schedule and Conditionally Deallocate a Thread

Figure 6:
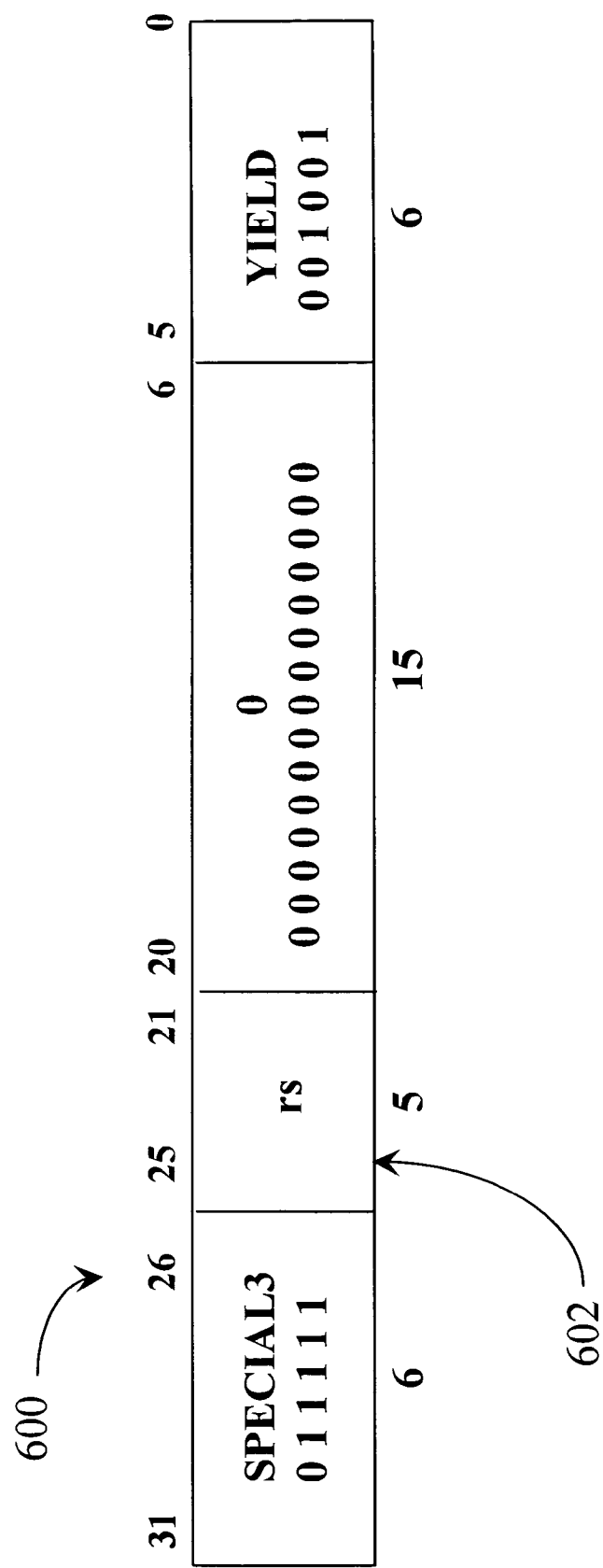
FIG. 6 shows format for a YIELD instruction in an embodiment of the invention.
Figure 32:
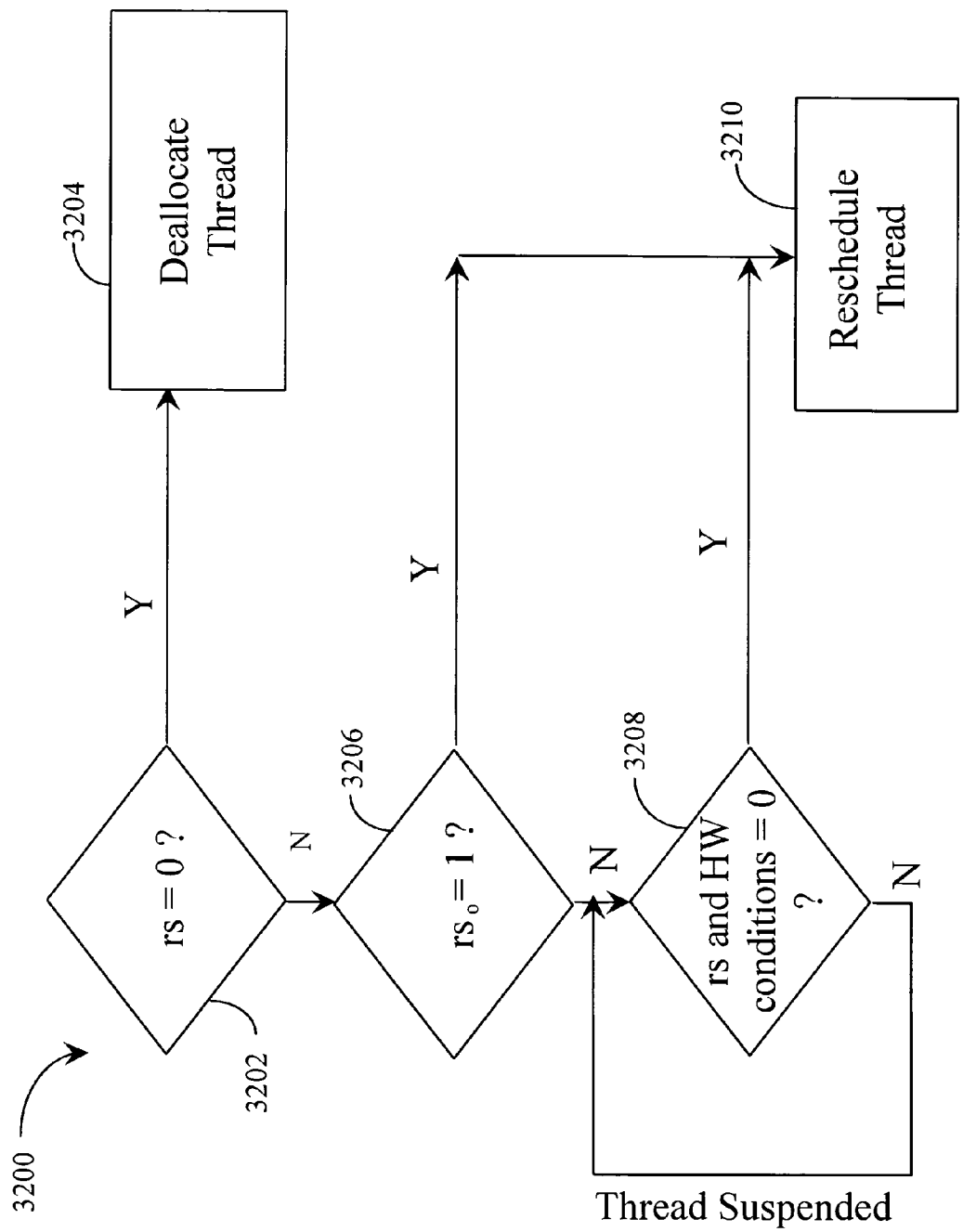
FIG. 32 is a flow diagram illustrating operation of a YIELD function in an embodiment of the invention.

The YIELD instruction causes the current thread to be de-scheduled. Its format 600 is shown in FIG. 6, and FIG. 32 is a flow chart 3200 illustrating operation of a system in an embodiment of the invention to assert the function of the YIELD instruction.

The YIELD instruction takes a single operand value from, for example, a GPR identified in field 602 (rs). A GPR is used in a preferred embodiment, but in alternative embodiments the operand value may be stored in and retrieved from essentially any data storage device (e.g., non-GPR register, memory, etc.) accessible to the system. In one embodiment, contents of GPR rs can be thought of as a descriptor of the circumstances under which the issuing thread should be rescheduled. If the contents of GPR rs is zero (i.e., the value of the operand is zero), as shown in step 3202 of FIG. 32, the thread is not to be rescheduled at all, and it is instead deallocated (i.e., terminated or otherwise permanently stopped from further execution) as indicated in step 3204, and its associated thread context storage (i.e., the registers identified above to save state) freed for allocation by a subsequent FORK instruction issued by some other thread. If the least significant bit of the GPR rs is set (i.e., $rs_0=1$), the thread is immediately re-schedulable as shown in step 3206 of FIG. 32, and may promptly continue execution if there are no other runnable threads that would be preempted. The contents of GPR rs, in this embodiment, is otherwise treated as a 15-bit qualifier mask described by table 700 of FIG. 7 (i.e., a bit vector encoding a variety of conditions).

Referring to table 700, bits 15 to 10 of the GPR rs indicate hardware interrupt signals presented to the processor, bits 9 and 8 indicate software interrupts generated by the processor, bits 7 and 6 indicate the operation of the Load Linked and Store Conditional synchronization primitives of the MIPS architecture, and bits 5 to 2 indicate non-interrupt external signals presented to the processor.

If the content of GPR rs is even (i.e., bit zero is not set), and any other bit in the qualifier mask of GPR rs is set (step 3208), the thread is suspended until at least one corresponding condition is satisfied. If and when such a situation occurs, the thread is rescheduled (step 3210) and resumes execution at the instruction following the YIELD. This enabling is unaffected by the CP0. Status.IMn interrupt mask bits, so that up to 10 external conditions (e.g., events, etc.) encoded by bits 15 to 10 and 5 to 2 (as shown in FIG. 7) and four software conditions encoded by bits 9 to 6 (as shown in FIG. 7) can be used in the present embodiment to enable independent threads to respond to external signals without any need for the processor to take an exception. In this particular example there are six hardware interrupts and four non-interrupt signals, plus two software interrupts and two nor-interrupt signals, and a single dedicated rescheduling function (i.e., $rs_0$) for a total of fifteen conditions. (The CP0. Status.iMn interrupt mask bits are a set of 8 bits in the CP0 Status register which can optionally mask the 8 basic interrupt inputs to a MIPS Processor. If an IM bit is set, the associated interrupt input will not cause an exception to the processor when asserted.)

In EIC interrupt mode, the IP2-IP7 bits encode the value of the highest priority enabled interrupt, rather than express a vector of orthogonal indications. The GPR rs bits associated with IP2-IP7 in a YIELD instruction when the processor is using EIC interrupt mode can thus no longer be used to re-enable thread scheduling on a specific external event. In EIC mode, only the system-dependent external event indications (i.e., bits 5 to 2 of the GPR rs of the present embodiment) should be used as YIELD qualifiers. The EIC interrupt mode and IP2-IP7 bits are further described in the following publications as fully identified and incorporated above: *MIPS32™ Architecture for Programmers Volume III: The MIPS32™ Privileged Resource Architecture*, and *MIPS64™ Architecture for Programmers Volume III: The MIPS64™ Privileged Resource Architecture*.

If the execution of a YIELD results in the de-allocation of the last allocated thread on a processor or VPE, a Thread Exception, with an underflow indication in the ThreadStatus register of CP0 (shown in FIG. 18 and described below), is raised on the YIELD instruction.

The foregoing embodiment utilizes the operand contained in the GPR rs of the YIELD instruction as a thread-scheduling parameter. In this case, the parameter is treated as a 15-bit vector of orthogonal indications (referring to FIG. 7, bits 1 and 15 are reserved so there are only 15 conditions encoded in this preferred embodiment). This embodiment also treats the parameter as a designated value (i.e., to determine whether or not a given thread should be deallocated, see step 3202 of FIG. 32). The characteristics of such a parameter may be changed, however, to accommodate different embodiments of the instruction. For example, rather than rely on the least significant bit (i.e., $rs_0$) to determine whether a thread is immediately re-schedulable, the value of the parameter itself (e.g., a value of minus one $\{-1\}$ in two's complement form) may be used to determine whether a thread should be immediately rescheduled (i.e., re-queued for scheduling).

Other embodiments of this instruction may treat such a thread-scheduling parameter as containing one or more multi-bit value fields so that a thread can specify that it will yield on a single event out of a large (e.g., 32-bit, or larger) event name space. In such an embodiment, at least the bits associated with the one target event would be accessed by the subject YIELD instruction. Of course, additional bit fields could be passed to the instruction (associated with additional events) as desired for a particular embodiment.

Figure 8:
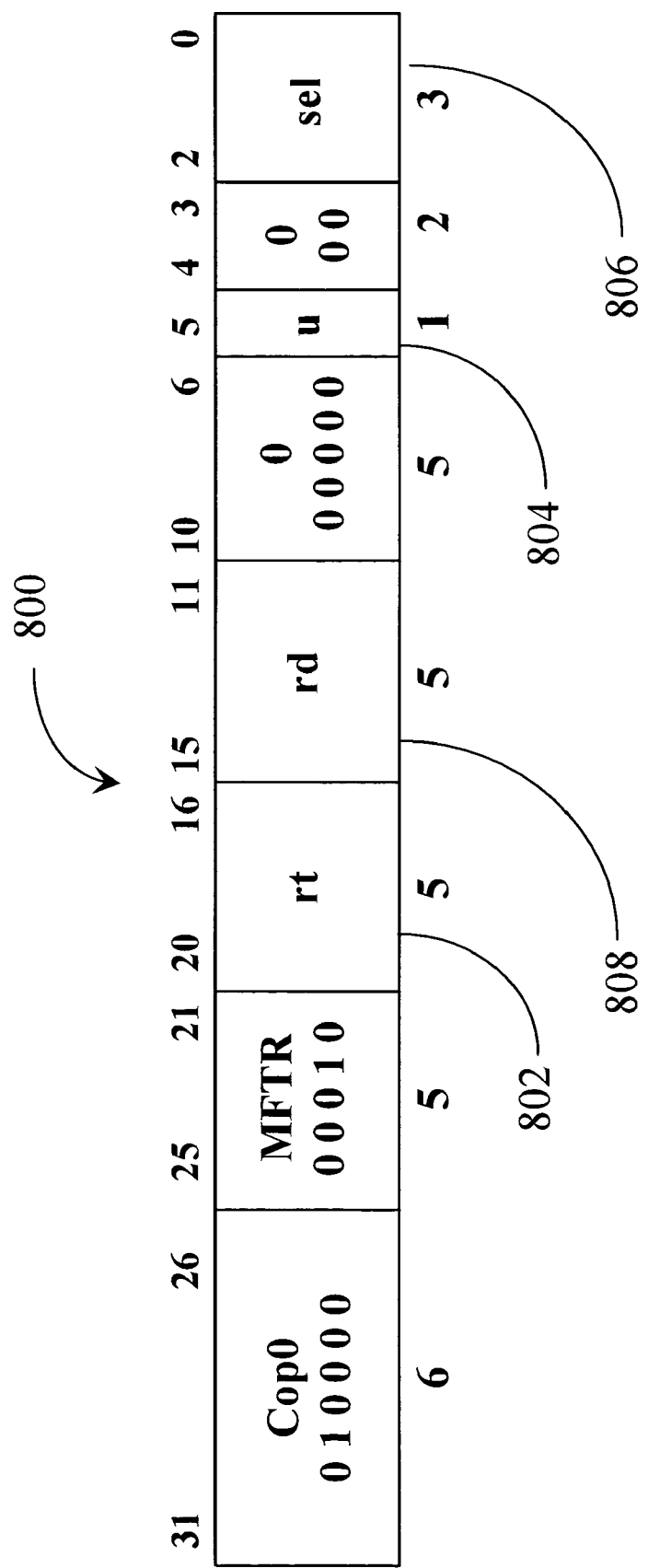
FIG. 8 shows format for a MFTR instruction in an embodiment of the invention.

Other embodiments of the YIELD instruction may include a combination of the foregoing bit vector and value fields within a thread-scheduling parameter accessed by the instruction, or other application-specific modifications and enhancements to (for example) satisfy the needs of a specific implementation. Alternative embodiments of the YIELD instruction may access such a thread-scheduling parameter as described above in any conventional way; e.g., from a GPR (as shown in FIG. 6), from any other data storage device (including memory) and as an immediate value within the instruction itself MFTR—Move From Thread Register The MFTR instruction is a privileged (Cop0) instruction which allows an operating system executing on one thread to access a different thread context. Its format 800 is shown in FIG. 8.

Figure 16:
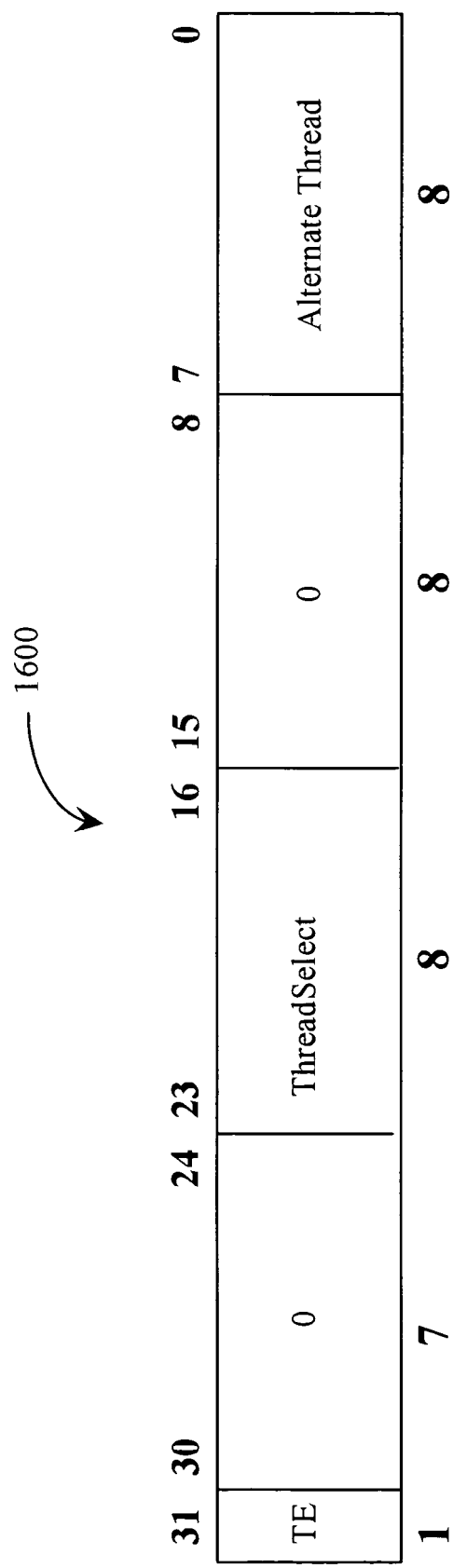
FIG. 16 shows layout of a ThreadControl register in an embodiment of the invention.

The thread context to be accessed is determined by the value of the AlternateThread field of the ThreadControl register of CP0, which is shown in FIG. 16 and described below. The register to be read within the selected thread context is determined by the value in the rt operand register identified in field 802, in conjunction with the u and sel bits of the MFTR instruction provided in fields 804 and 806, respectively, and interpreted according to table 900 included as FIG. 9. The resulting value is written into the target register rd, identified in field 808.

MTTR—Move To Thread Register

Figure 10:
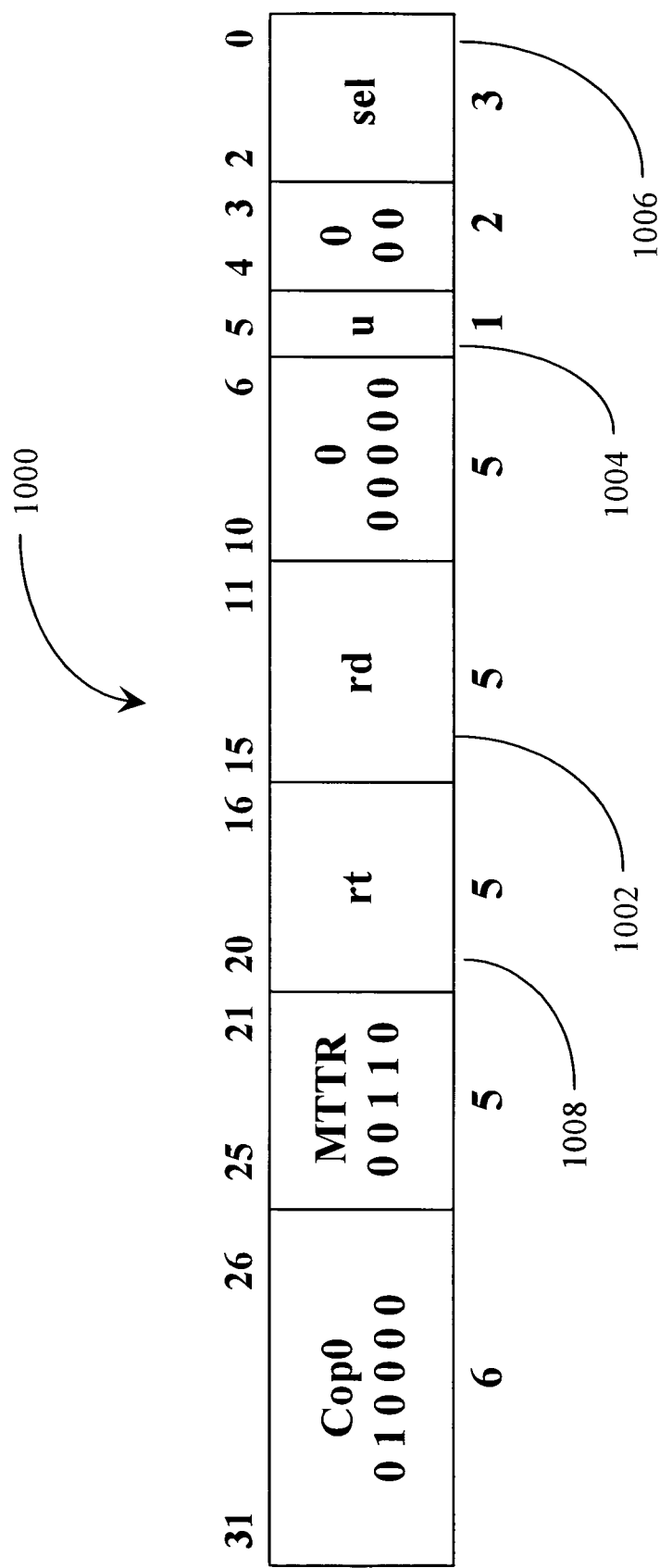
FIG. 10 shows format for a MTTR instruction in an embodiment of the invention.

The MTTR instruction is the inverse of MFTR. It is a privileged Cop0 instruction which copies a register value from the thread context of the current thread to a register within another thread context. Its format 1000 is shown in FIG. 10.

Figure 11:
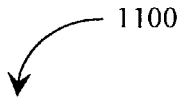
FIG. 11 is a table for interpreting u and sel bits of the MTTR instruction in an embodiment of the invention.

The thread context to be accessed is determined by the value of the AlternateThread field of the ThreadControl register of CP0, which is shown in FIG. 16 and described below. The register to be written within the selected thread context is determined by the value in the rd operand register identified in field 1002, in conjunction with the u and sel bits of the MTTR instruction provided in fields 1004 and 1006, respectively, and interpreted according to table 1100 provided in FIG. 11 (the encoding is the same as for MFTR). The value in register rt, identified in field 1008, is copied to the selected register.

EMT—Enable Multithreading

Figure 12:
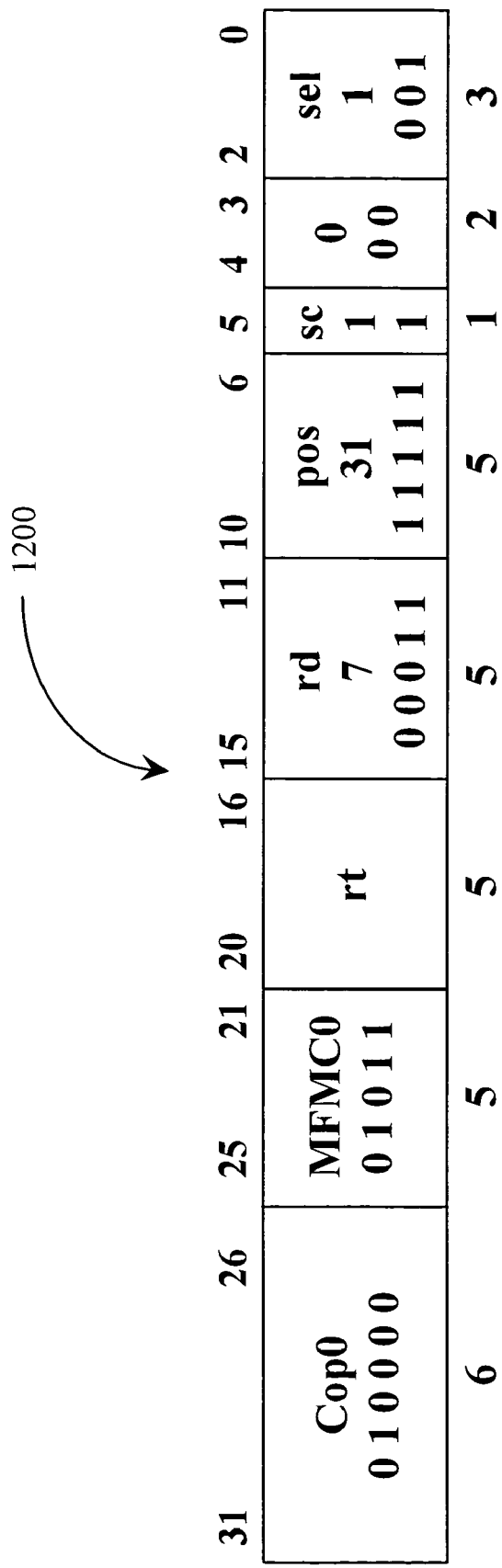
FIG. 12 shows format for an EMT instruction in an embodiment of the invention.

The EMT instruction is a privileged Cop0 instruction which enables the concurrent execution of multiple threads by setting the TE bit of the ThreadControl register of CP0, which is shown in FIG. 16 and described below. Its format 1200 is shown in FIG. 12. The value of the ThreadControl register, containing the TE (Threads Enabled) bit value prior to the execution of the EMT, is returned in register rt.

DMT—Disable Multithreading

Figure 13:
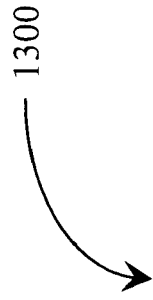
FIG. 13 shows format for a DMT instruction in an embodiment of the invention.

The DMT instruction is a privileged Cop0 instruction which inhibits the concurrent execution of multiple threads by clearing the TE bit of the ThreadControl register of CP0, which is shown in FIG. 16 and described below. Its format 1300 is shown in FIG. 13.

All threads other than the thread issuing the DMT instruction are inhibited from further instruction fetch and execution. This is independent of any per-thread halted state. The value of the ThreadControl register, containing the TE (Threads Enabled) bit value prior to the execution of the DMT, is returned in register rt.

ECONF—End Processor Configuration

Figure 14:
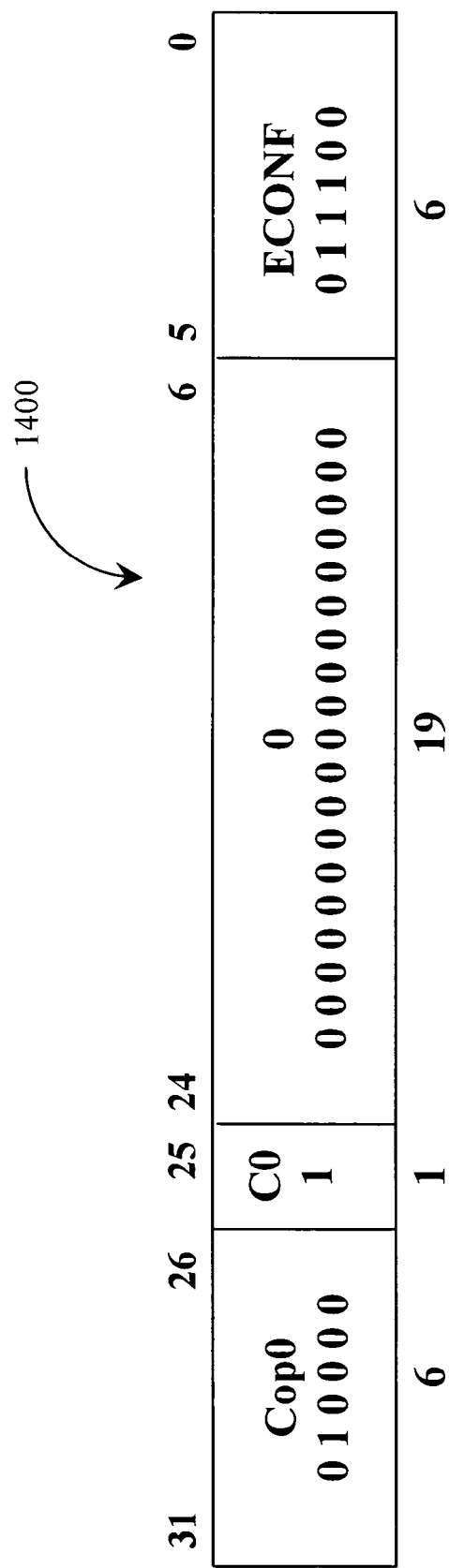
FIG. 14 shows format for an ECONF instruction in an embodiment of the invention.

The ECONF instruction is a privileged Cop0 instruction which signals the end of VPE configuration and enables multi-VPE execution Its format 1400 is shown in FIG. 14.

When an ECONF is executed, the VPC bit of the Config3 register (described below) is cleared, the MVP bit of this same register becomes read-only at its current value, and all VPEs of a processor, including the one executing the ECONF, take a Reset exception.

Privileged Resources

The table 1500 of FIG. 15 outlines the system coprocessor privileged resources associated with the Multithreading ASE. Except where indicated otherwise, the new and modified coprocessor zero (CP0) registers identified below are accessible (i.e., written into and read from) like conventional system control registers of coprocessor zero (i.e., of a MIPS Processor).

New Privileged Resources (A) ThreadControl Register (Coprocessor 0 Register 7, Select 1)

Figure 17:
FIG. 17 is a table defining ThreadControl register fields in an embodiment of the invention.

The ThreadControl register is instantiated per VPE as part of the system coprocessor. Its layout 1600 is shown in FIG. 16. The ThreadControl Register fields are defined according to table 1700 of FIG. 17.

(B) ThreadStatus Register (Coprocessor Register 12, Select 4)

Figure 18:
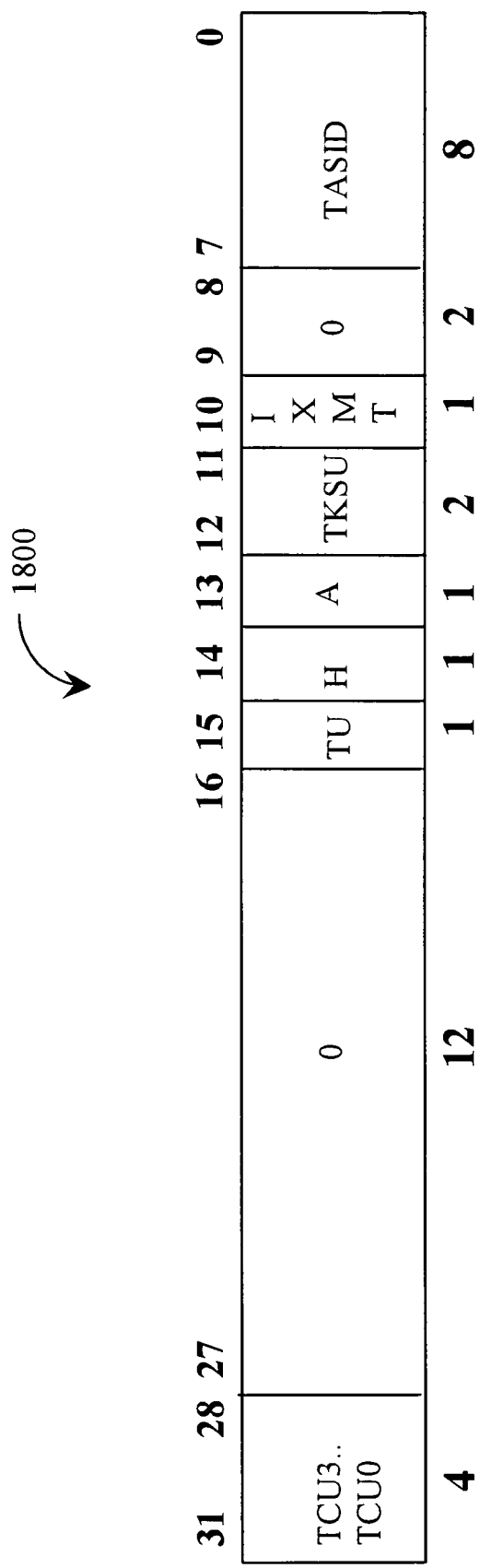
FIG. 18 shows layout for a ThreadStatus register in an embodiment of the invention.

The ThreadStatus register is instantiated per thread context. Each thread sees its own copy of ThreadStatus, and privileged code can access those of other threads via MFTR and MTTR instructions. Its layout 1800 is shown in FIG. 18. The ThreadStatus Register fields are defined in table 1900 of FIG. 19.

Writing a one to the Halted bit of an activated thread causes an activated thread to cease fetching instructions and to set its internal restart PC to the next instruction to be issued. Writing a zero to the Halted bit of an activated thread allows the thread to be scheduled, fetching and executing from the internal restart PC address. A one in either the Activated bit or the Halted bit of a non-activated thread prevents that thread from being allocated and activated by a FORK instruction.

(C) ThreadContext Register (Coprocessor 0 Register 4, Select 1)

Figure 20:
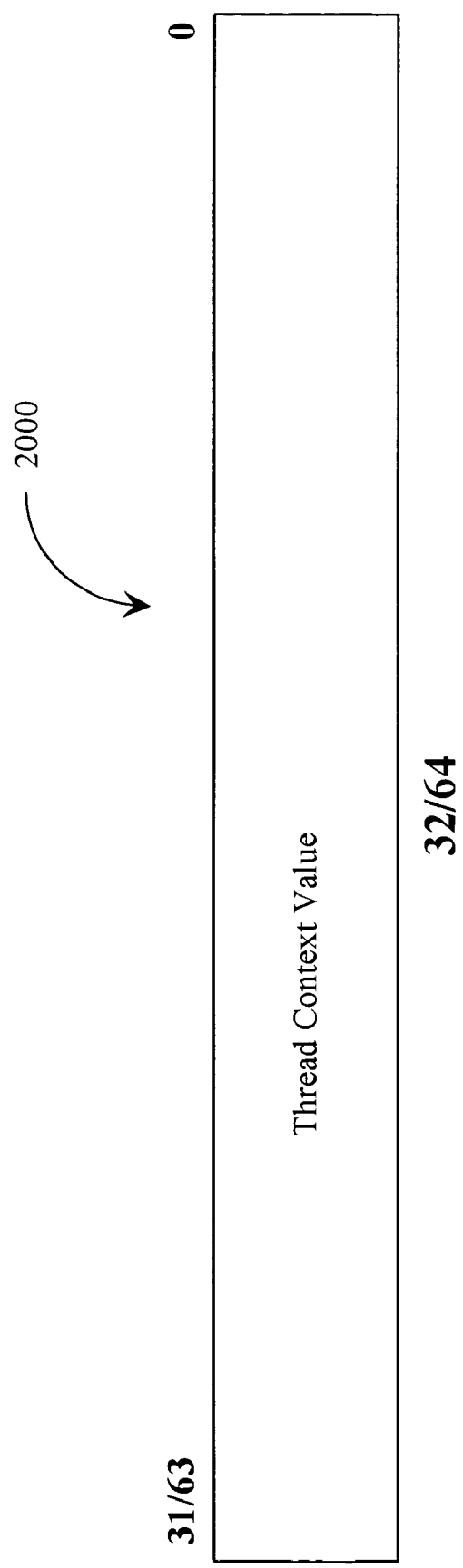
FIG. 20 shows layout of a ThreadContext register in an embodiment of the invention.

The ThreadContext register 2000 is instantiated per-thread, with the same width as the processor GPRs, as shown in FIG. 20. This is purely a software read/write register, usable by the operating system as a pointer to thread-specific storage, e.g. a thread context save area.

(D) ThreadConfig Register (Coprocessor 0 Register 6, Select 1)

Figure 22:
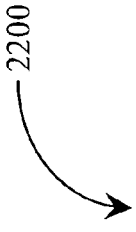
FIG. 22 is a table defining fields of the ThreadConfig register in an embodiment of the invention.

The ThreadConfig register is instantiated per-processor or VPE. Its layout 2100 is shown in FIG. 21. The ThreadConfig registers fields are defined in table 2200 of FIG. 22.

The WiredThread field of ThreadConfig allows the set of thread contexts available on a VPE to be partitioned between Shadow Register sets and parallel execution threads. Thread contexts with indices less than the value of the WiredThread register are available as shadow register sets.

(E) ThreadSchedule Register (Coprocessor 0 Register 6, Select 2)

Figure 23:
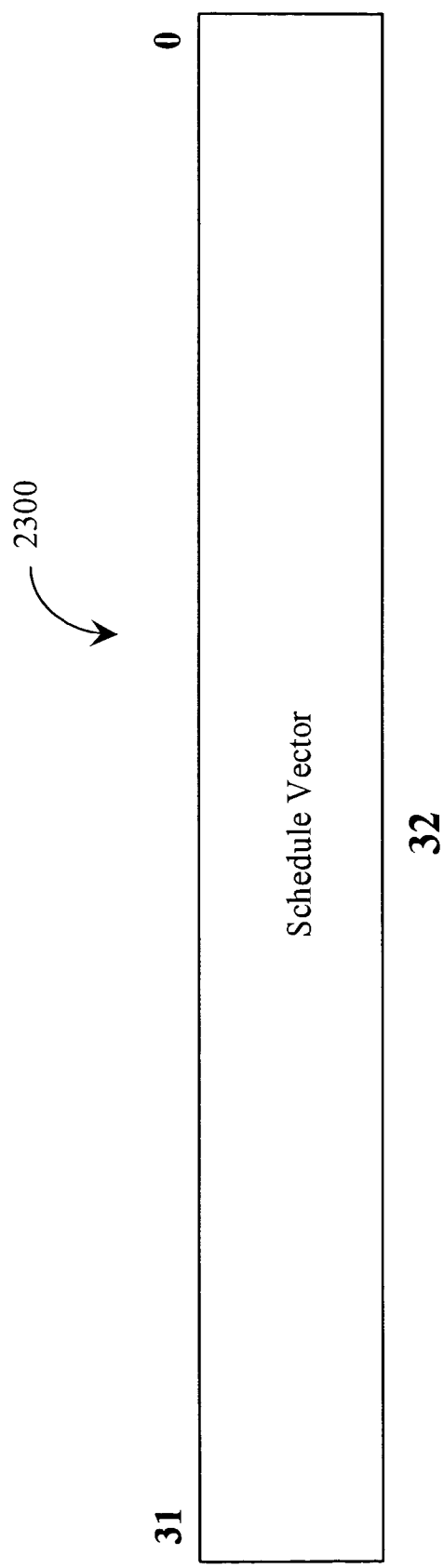
FIG. 23 shows layout of a ThreadSchedule register in an embodiment of the invention.

The ThreadSchedule register is optional, but when implemented is preferably implemented per-thread. Its layout 2300 is shown in FIG. 23.

The Schedule Vector (which, as shown, is 32 bits wide in a preferred embodiment) is a description of the requested issue bandwidth scheduling for the associated thread. In this embodiment, each bit represents 1/32 of the issue bandwidth of the processor or VPE, and each bit location represents a distinct slot in a 32-slot scheduling cycle.

If a bit in a thread's ThreadSchedule register is set, that thread has a guarantee of the availability of one corresponding issue slot for every 32 consecutive issues possible on the associated processor or VPE. Writing a 1 to a bit in a thread's ThreadSchedule register when some other thread on the same processor or VPE already has the same ThreadSchedule bit set will result in a Thread exception. Although 32 bits is the preferred width of the ThreadSchedule register, it is anticipated that this width may be altered (i.e., increased or decreased) when used in other embodiments.

(F) VPESchedule Register (Coprocessor 0 Register 6, Select 3)

Figure 24:
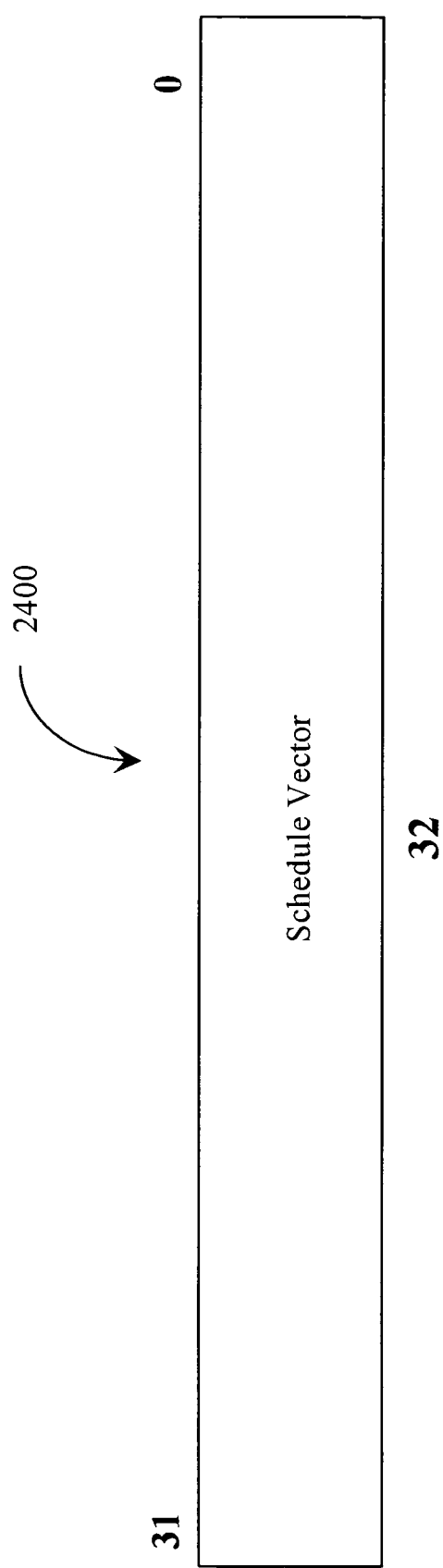
FIG. 24 shows layout of a VPESchedule register in an embodiment of the invention.

The VPESchedule register is optional, and is preferably instantiated per VPE. It is writable only if the MVP bit of the Config3 register is set (see, FIG. 29). Its format 2400 is shown in FIG. 24.

The Schedule Vector (which, as shown, is 32 bits wide in a preferred embodiment) is a description of the requested issue bandwidth scheduling for the associated VPE. In this embodiment, each bit represents 1/32 of the issue total bandwidth of a multi-VPE processor, and each bit location represents a distinct slot in a 32-slot scheduling cycle.

If a bit in a VPE's VPESchedule register is set, that thread has a guarantee of the availability of one corresponding issue slot for every 32 consecutive issues possible on the processor. Writing a 1 to a bit in a VPE's VPESchedule register when some other VPE already has the same VPESchedule bit set will result in a Thread exception.

Issue slots not specifically scheduled by any thread are free to be allocated to any runnable VPE/thread according to the current default thread scheduling policy of the processor (e.g., round robin, etc.).

The VPESchedule register and the ThreadSchedule register create a hierarchy of issue bandwidth allocation. The set of VPESchedule registers assigns bandwidth to VPEs as a proportion of the total available on a processor or core, while the ThreadSchedule register assigns bandwidth to threads as a proportion of that which is available to the VPE containing the threads.

Although 32 bits is the preferred width of the VPESchedule register, it is anticipated that this width may be altered (i.e., increased or decreased) when used in other embodiments.

(G) The Config4 Register (Coprocessor 0 Register 16, Select 4)

Figure 25:
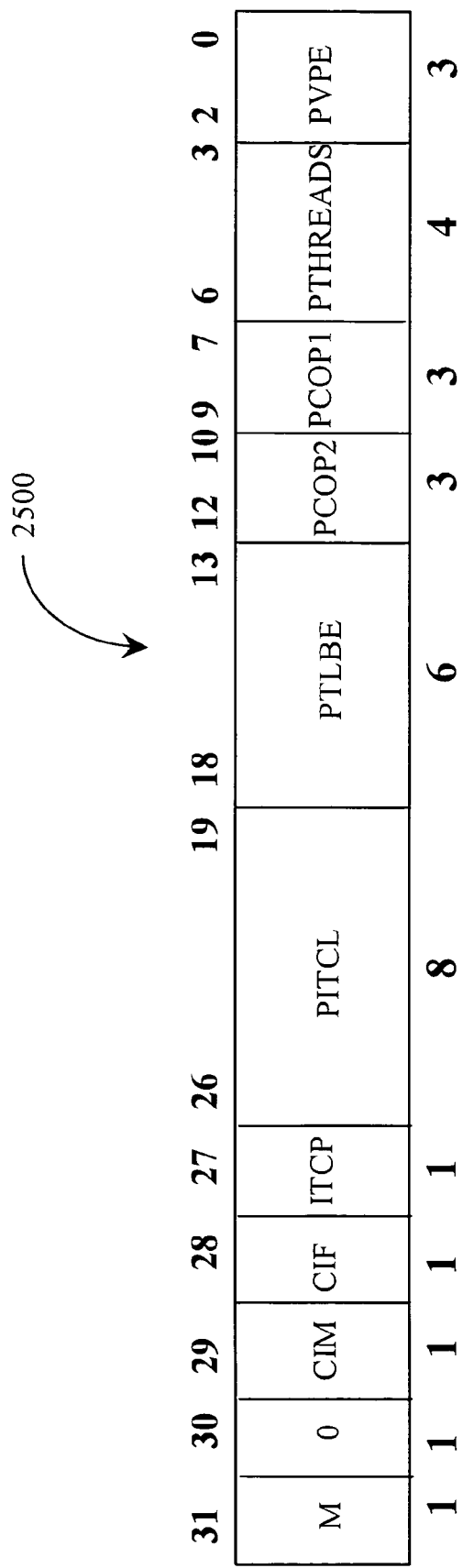
FIG. 25 shows layout of a Config4 register in an embodiment of the invention.

The Config4 Register is instantiated per-processor. It contains configuration information necessary for dynamic multi-VPE processor configuration. If the processor is not in a VPE configuration state (i.e., the VMC bit of the Config3 register is set), the value of all fields except the M (continuation) field is implementation-dependent and may be unpredictable. Its layout 2500 is shown in FIG. 25. The Config4's register fields are defined as shown in table 2600 of FIG. 26. In some embodiments there may be a VMC bit for the Config3 register, which can be a previously reserved/unassigned bit.

Modifications to Existing Privileged Resource Architecture

The Multithreading ASE modifies some elements of current MIPS32 and MIPS64 PRA.

(A) Status Register

The CU bits of the Status register take on additional meaning in a multithreaded configuration. The act of setting a CU bit is a request that a coprocessor context be bound to thread associated with the CU bit. If a coprocessor context is available, it is bound to the thread so that instructions issued by the thread can go to the coprocessor, and the CU bit retains the 1 value written to it. If no coprocessor context is available, the CU bit reads back as 0. Writing a 0 to a set CU bit causes any associated coprocessor to be deallocated.

(B) Cause Register

Figure 27:
FIG. 27 is a table defining Cause register ExcCode values required for thread exceptions.

There is a new Cause register ExcCode value required for the Thread exceptions, as shown in FIG. 27.

(C) EntryLo Register

A previously reserved cache attribute becomes the ITC indicator, as shown in FIG. 28.

(D) Config3 Register

There are new Config3 register fields defined to express the availability of the Multithreading ASE and of multiple thread contexts, as shown in table 2900 of FIG. 29.

(E) EBase

Figure 30:
FIG. 30 is a table illustrating VPE inhibit bit per VPE context.

The previously reserved bit 30 of the EBase register becomes a VPE inhibit bit per VPE context, as is illustrated in FIG. 30.

(F) SRSCtl

The formerly preset HSS field now generated as a function of the ThreadConfig WiredThread field.

Thread Allocation and Initialization Without FORK

The procedure for an operating system to create a thread "by hand" in a preferred embodiment is:
1. Execute a DMT to stop other threads from executing and possibly FORKing.
2. Identify an available ThreadContext by setting the AlternateThread field of the ThreadControl register to successive values and reading the ThreadStatus registers with MFTR instructions. A free thread will have neither the Halted nor the Activated bit of its ThreadStatus register set.
3. Set the Halted bit of the selected thread's ThreadStatus register to prevent it being allocated by another thread.
4. Execute an EMT instruction to re-enable multithreading.
5. Copy any desired GPRs into the selected thread context using MTTR instructions with the u field set to 1.
6. Write the desired starting execution address into the thread's internal restart address register using an MTTR instruction with the u and sel fields set to zero, and the rt field set to 14 (EPC).
7. Write a value with zero in the Halted bit and one in the Activated bit to the selected ThreadStatus register using an MTTR instruction.

The newly allocated thread will then be schedulable. The steps of executing DMT, setting the new thread's Halted bit, and executing EMT can be skipped if EXL or ERL are set during the procedure, as they implicitly inhibit multithreaded execution.

Thread Termination and Deallocation without YIELD

The procedure for an operating system to terminate the current thread in a preferred embodiment is:
1. If the OS has no support for a Thread exception on a Thread Underflow state, scan the set of ThreadStatus registers using MFTR instructions to verify that there is another runnable thread on the processor, or, if not, signal the error to the program.
2. Write any important GPR register values to memory.
3. Set Kernel mode in the Status/ThreadStatus register.
4. Clear EXL/ERL to allow other threads to be scheduled while the current thread remains in a privileged state.
5. Write a value with zero in both the Halted and the Activated bits of the ThreadStatus register using a standard MTC0 instruction.

The normal procedure is for a thread to terminate itself in this manner. One thread, running in a privileged mode, could also terminate another, using MTTR instructions, but it would present an additional problem to the OS to determine which thread context should be deallocated and at what point the state of the thread's computation is stable.

Inter-Thread Communication Storage

Inter-Thread Communication (ITC) Storage is an optional capability which provides an alternative to Load-Linked/Store-Conditional synchronization for fine-grained multithreading. It is invisible to the instruction set architecture, as it is manipulated by loads and stores, but it is visible to the Privileged Resource Architecture, and it requires significant microarchitectural support.

References to virtual memory pages whose TLB entries are tagged as ITC storage resolve to a store with special attributes. Each page maps a set of 1-128 64-bit storage locations, each of which has an Empty/Full bit of state associated with it, and which can be accessed in one of 4 ways, using standard load and store instructions. The access mode is encoded in the least significant (and untranslated) bits of the generated virtual address, as shown in table 3100 of FIG. 31.

Each storage location could thus be described by the C structure:

```
struct {
    uint64 ef_sync_location;
    uint64 force_ef_location;
    uint64 bypass_location;
    uint64 ef_state;
} ITC_location;
``` where all four of the locations reference the same 64 bits of underlying storage. References to this storage may have access types of less than 64 bits (e.g. LW, LH, LB), with the same Empty/Full protocol being enforced on a per-access basis.

Empty and Full bits are distinct so that decoupled multi-entry data buffers, such as FIFOs can be mapped into ITC storage.

ITC storage can be saved and restored by copying the {bypass_location, ef_state} pair to and from general storage. While 64 bits of bypass_location must be preserved, strictly speaking, only the least significant bits of the ef_state need to be manipulated. In the case of multi-entry data buffers, each location must be read until Empty to drain the buffer on a copy.

The number of locations per 4K page and the number of ITC pages per VPE are configuration parameters of the VPE or processor.

The "physical address space" of ITC storage can be made global across all VPEs and processors in a multiprocessor system, such that a thread can synchronize on a location on a different VPE from the one on which it is executing. Global ITC storage addresses are derived from the CPUNum field of each VPE's EBase register. The 10 bits of CPUNum correspond to 10 significant bits of the ITC storage address. Processors or cores designed for uniprocessor applications need not export a physical interface to the ITC storage, and can treat it as a processor-internal resource.

Multi-VPE Processors

A core or processor may implement multiple VPEs sharing resources such as functional units. Each VPE sees its own instantiation of the MIPS32 or MIPS64 instruction and privileged resource architectures. Each sees its own register file or thread context array, each sees its own CP0 system coprocessor and its own TLB state. Two VPEs on the same processor are indistinguishable to software from a 2-CPU cache-coherent SMP multiprocessor.

Each VPE on a processor sees a distinct value in the CPUNum field of the Ebase register of CP0.

Processor architectural resources such as thread context and TLB storage and coprocessors may be bound to VPEs in a hardwired configuration, or they may be configured dynamically in a processor supporting the necessary configuration capability.

Reset and Virtual Processor Configuration

To be backward compatible with the MIPS32 and MIPS64 PRAs, a configurably multithreaded//multi-VPE processor must have a sane default thread/VPE configuration at reset. This would typically be, but need not necessarily be, that of a single VPE with a single thread context. The MVP bit of the Config3 register can be sampled at reset time to determine if dynamic VPE configuration is possible. If this capability is ignored, as by legacy software, the processor will behave as per specification for the default configuration.

If the MVP bit is set, the VPC (Virtual Processor Configuration) bit of the Config3 register can be set by software. This puts the processor into a configuration state in which the contents of the Config4 register can be read to determine the number of available VPE contexts, thread contexts, TLB entries, and coprocessors, and certain normally read-only "preset" fields of Config registers that become writable. Restrictions may be imposed on configuration state instruction streams, e.g. they may be forbidden to use cached or TLB-mapped memory addresses.

In the configuration state, the total number of configurable VPEs is encoded in the PVPE field of the Config4 register. Each VPE can be selected by writing its index into the CPUNum field of the EBase register. For the selected VPE, the following register fields can potentially be set by writing to them.

Config1.MMU_Size
Config1.FP
Config1.MX
Config1.C2
Config3.NThreads
Config3.NITC_Pages
Config3.NITC_PLocs
Config3.MVP
VPESchedule Not all of the above configuration parameters need be configurable. For example, the number of ITC locations per page may be fixed, even if the ITC pages per VPE is configurable, or both parameters may be fixed, FPUs may be pre-allocated and hardwired per VPE, etc.

Coprocessors are allocated to VPEs as discrete units. The degree to which a coprocessor is multithreaded should be indicated and controlled via coprocessor-specific control and status registers.

A VPE is enabled for post-configuration execution by clearing the VPI inhibit bit in the EBase register.

The configuration state is exited by issuing an ECONF instruction. This instruction causes all uninhibited VPEs to take a reset exception and begin executing concurrently. If the MVP bit of the Config3 register is cleared during configuration and latched to zero by an ECONF instruction, the VPC bit can no longer be set, and the processor configuration is effectively frozen until the next processor reset. If MVP remains set, an operating system may re-enter the configuration mode by again setting the VPC bit. The consequences to a running VPE of the processor re-entering configuration mode may be unpredictable.

Quality of Service Scheduling for Multithreaded Processors

This specification up to the present point describes an application specific extension for a MIPS compatible system to accommodate multithreading. As previously stated, the MIPS implementation described is exemplary, and not limiting, as the functionality and mechanisms described may be applied in other than MIPS systems.

An issue visited in the background section, that of special service in multithreading for real-time and near real-time threads, has been briefly touched upon in the foregoing discussion directed to the ThreadSchedule register (FIG. 23) and VPESchedule register (FIG. 24). The balance of this specification deals with this issue in greater detail; teaching specific extensions for dealing specifically with thread-level quality of service ("QoS").

Background

Networks designed for transporting multimedia data evolved a concept of Quality of Service ("QoS") to describe the need for different policies to be applied to different data streams in a network. Speech connections, for example, are relatively undemanding of bandwidth, but cannot tolerate delays beyond a few tens of milliseconds. QoS protocols in broadband multimedia networks ensure that time-critical transfers get whatever special handling and priority is necessary to ensure timely delivery.

One of the primary objections raised to combining "RISC" and "DSP" program execution on a single chip is that guaranteeing the strict real-time execution of the DSP code is far more difficult in a combined multi-tasking environment. The DSP applications can thus be thought of as having a "QoS" requirement for processor bandwidth.

Multithreading and QoS

There are a number of ways to schedule issuing of instructions from multiple threads. Interleaved schedulers will change threads every cycle, while blocking schedulers will change threads whenever a cache miss or other major stall occurs. The Multithreading ASE described in detail above, provides a framework for explicitly multithreaded processors that attempts to avoid any dependency on a specific thread scheduling mechanism or policy. However, scheduling policy may have a huge impact on what QoS guarantees are possible for the execution of the various threads.

A DSP-extended RISC becomes significantly more useful if QoS guarantees can be made about the real-time DSP code. Implementing multithreading on such a processor, such that the DSP code is running in a distinct thread, perhaps even a distinct virtual processor, and such that the hardware scheduling of the DSP thread can be programmably determined to provide assured QoS, logically removes a key barrier to acceptance of a DSP-enhanced RISC paradigm.

QoS Thread Scheduling Algorithms

Quality of Service thread scheduling can be loosely defined as a set of scheduling mechanisms and policies which allow a programmer or system architect to make confident, predictive statements about the execution time of a particular piece of code. These statements in general have the form "This code will execute in no more than Nmax and no less than Nmin cycles". In many cases, the only number of practical consequence is the Nmax number, but in some applications, running ahead of schedule is also problematic, so Nmin may also matter. The smaller the range between Nmin and Nmax, the more accurately the behavior of the overall system can be predicted.

Simple Priority Schemes

One simple model that has been proposed for providing some level of QoS to multithreaded issue scheduling is simply to assign maximal priority to a single designated real-time thread, such that if that thread is runnable, it will always be selected to issue instructions. This will provide the smallest value of Nmin, and might seem to provide the smallest possible value of Nmax for the designated thread, but there are some adverse consequences.

Firstly, only a single thread can have any QoS assurance in such a scheme. The algorithm implies that the Nmax for any code in a thread other than the designated real-time thread becomes effectively unbounded. Secondly, while the Nmin number for a code block within the designated thread is minimized, exceptions must be factored into the model. If the exceptions are taken by the designated thread, the Nmax value becomes more complex, and in some cases impossible to determine. If the exceptions are taken by threads other than the designated thread, Nmax is strictly bounded for code in the designated thread, but the interrupt response time of the processor becomes unbounded.

While such priority schemes may be useful in some cases, and may have some practical advantages in hardware implementation, they do not provide a general QoS scheduling solution.

Reservation-Based Schemes

An alternative, more powerful and unique thread-scheduling model is based on reserving issue slots. The hardware scheduling mechanisms in such a scheme allow one or more threads to be assigned N out of each M consecutive issue slots. Such a scheme does not provide as low an Nmin value as a priority scheme for a real-time code fragment in an interrupt-free environment, but it does have other virtues.

More than one thread may have assured QoS.

Interrupt latency can be bounded even if interrupts are bound to threads other than the one with highest priority. This can potentially allow a reduction in Nmax for real time code blocks.

One simple form of reservation scheduling assigns every Nth issue slot to a real-time thread. As there is no intermediate value of N between 1 and 2, this implies that real-time threads in a multithreading environment can get at most 50% of a processor's issue slots. As the real-time task may consume more than 50% of an embedded processor's bandwidth, a scheme which allows more flexible assignment of issue bandwidth is highly desirable.

Hybrid Thread Scheduling with QoS

The Multithreading system described above is deliberately scheduling-policy-neutral, but can be extended to allow for a hybrid scheduling model. In this model, real-time threads may be given fixed scheduling of some proportion of the thread issue slots, with the remaining slots assigned by the implementation-dependent default scheduling scheme.

Binding Threads to Issue Slots

In a processor instructions are issued sequentially at a rapid rate. In a multithreading environment one may quantify the bandwidth consumed by each thread in a mix by stating the proportional number of slots each thread issues in a given fixed number of slots. Conversely, the inventor recognizes that one may arbitrarily state a fixed number of slots, and predicate a means of constraining the processor to reserve a certain number of slots of the fixed number for a specific thread. One could then designate a fixed fraction of bandwidth guaranteed to a real-time thread.

Clearly one could assign slots proportionally to more than one real-time thread, and the granularity under which this scheme would operate is constrained by the fixed number of issue slots over which the proportions are made. For example, if one selects 32 slots, then any particular thread may be guaranteed from $1/32$ to $32/32$ of the bandwidth.

Perhaps the most general model, then, for assigning fixed issue bandwidth to threads is to associate each thread with a pair of integers, $\{N, D\}$ which form the numerator and denominator of a fraction of issue slots assigned to the thread, e.g. $1/2$, $4/5$. If the range of integers allowed is sufficiently large, this would allow almost arbitrarily fine-grained tuning of thread priority assignments, but it has some substantial disadvantages. One problem is that the hardware logic to convert a large set of pairs, $\{\{N_0, D_0\}, \{N_1, D_1\}, \ldots \{N_n, D_n\}\}$ into an issue schedule is non-trivial, and error cases in which more than 100% of slots are assigned are not necessarily easy to detect. Another is that, while such a scheme allows specification that, over the long run, a thread will be assigned N/D of the issue slots, it does not necessarily allow any statements to be made as to which issue slots will be assigned to a thread over a shorter subset code fragment.

Therefor, in a preferred embodiment of the present invention, instead of an integer pair, each thread for which real-time bandwidth QoS is desired is associated with a bit-vector which represents the scheduling slots to be allocated to that thread. In the preferred embodiment, this vector is visible to system software as the contents of a Thread-Schedule Register (FIG. 23) described above. Although the ThreadSchedule Register contains a scheduling "mask" that is 32 bits wide, the number of bits in this mask may be greater or fewer in alternative embodiments. A thread scheduling mask that is 32 bits wide allows for a thread to be assigned from 1/32 to 32/32 of the processor issue bandwidth, and furthermore allows a specific issue pattern to be specified. Given a 32 bit mask a value of 0xaaaaaaaa assigns every second slot to the thread. A value of 0x0000ffff also assigns 50% of the issue bandwidth to the thread, but in blocks of 16 consecutive slots. Assigning a value of 0xeeeeeeee to thread X and a value of 0x01010101 to thread Y gives thread X 3 out of every 4 (24 out of 32) cycles, thread Y 1 out of every 8 (4 out of 32) cycles, and leaves the remaining 4 cycles per group of 32 to be assigned to other threads by other, possibly less deterministic hardware algorithms. Further, it can be known that thread X will have 3 cycles out of every 4, and that thread Y will never have a gap of more than 8 cycles between consecutive instructions.

Scheduling conflicts in this embodiment can be detected fairly simply, in that no bit should be set in the ThreadSchedule Register of more than one thread. That is, if a particular bit is set for one thread, that bit must be zero for all other threads to which issue masks are assigned. Conflicts are thus relatively easy to detect.

The issue logic for real-time threads is relatively straightforward: Each issue opportunity is associated with a modulo-32 index, which can be sent to all ready threads, at most one of which will be assigned the associated issue slot. If there is a hit on the slot, the associated thread issues its next instruction. If no thread owns the slot, the processor selects a runnable non-real-time thread.

ThreadSchedule Register implementations of less than 32-bits would reduce the size of the per-thread storage and logic, but would also reduce the scheduling flexibility. In principle, the register could also be enlarged to 64-bits, or even implemented (in the case of a MIPS Processor) as a series of registers at incrementing select values in the MIPS32 CP0 register space to provide much longer scheduling vectors.

Exempting Threads from Interrupt Service

As noted above, interrupt service can introduce considerable variability in the execution time of the thread which takes the exception. It is therefore desirable to exempt threads requiring strict QoS guarantees from interrupt service. This is accomplished in a preferred embodiment with a single bit per thread, visible to the operating system, which causes any asynchronous exception raised to be deferred until a non-exempt thread is scheduled (i.e., bit IXMT of the ThreadStatus Register; see, FIGS. 18 and 19). This increases the interrupt latency, though to a degree that is boundable and controllable via the selection of ThreadSchedule Register values. If interrupt handler execution takes place only during issue slots not assigned to exempt real-time QoS threads, interrupt service has zero first-order effect on the execution time of such real-time code.

Issue Slot Allocation to Threads versus Virtual Processing Elements

The Multithreading ASE described in enabling detail above describes a hierarchical allocation of thread resources, wherein some number of Virtual Processing Elements (VPEs) each contain some number of threads. As each VPE has an implementation of CP0 and the privileged resource architecture (when configured on a MIPS Processor), it is not possible for the operating systems software ("OS") running on one VPE to have direct knowledge and control of which issue slots have been requested on another VPE. Therefore the issue slot name space of each VPE is relative to that VPE, which implies a hierarchy of issue slot allocation.

Figure 34:
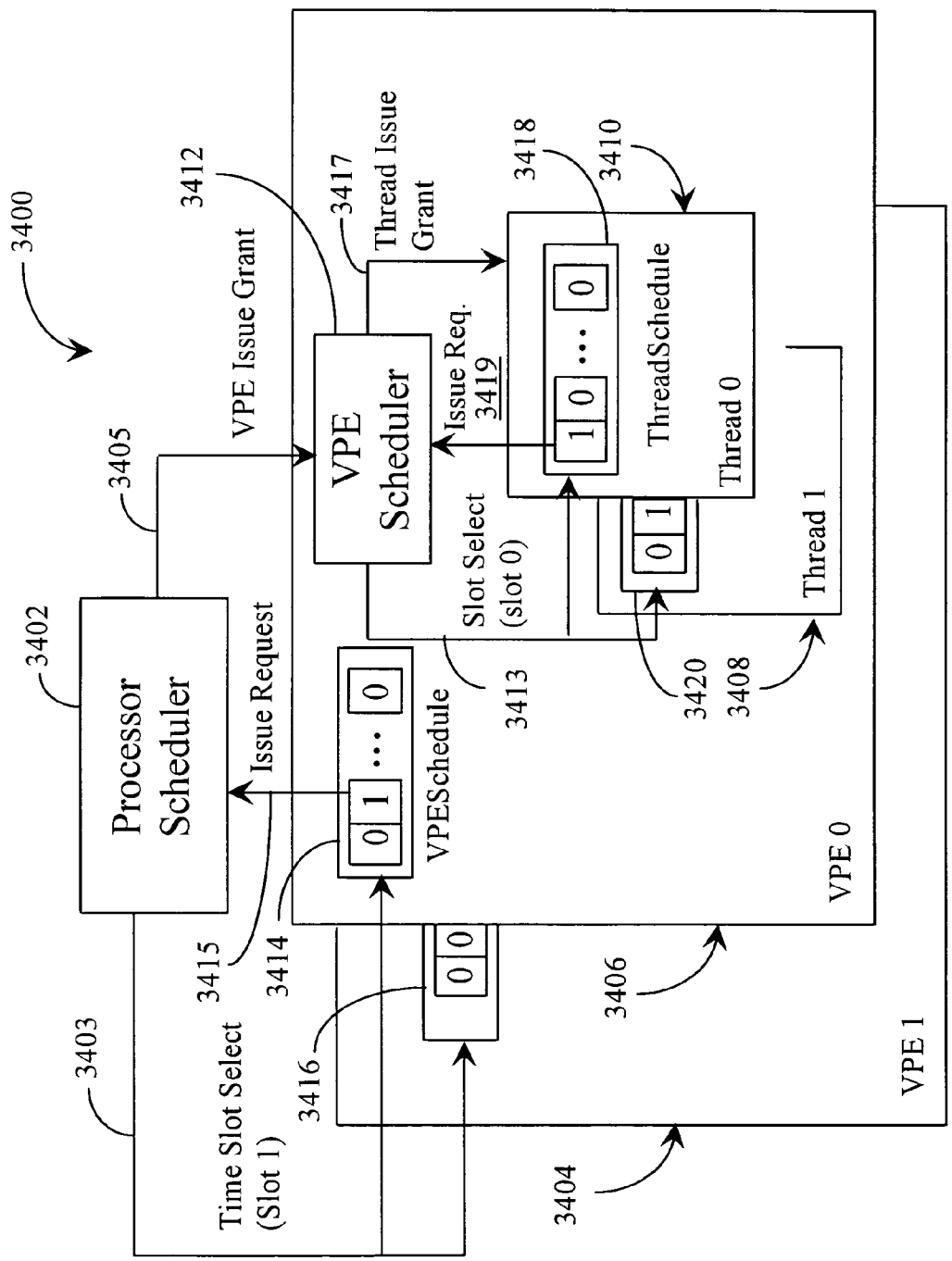
FIG. 34 is a diagram illustrating scheduling by VPE within a processor and by thread within a VPE in an embodiment of the present invention.

FIG. 34 is a block diagram of scheduling circuit 3400 illustrating this hierarchical allocation of thread resources. Processor Scheduler 3402 (i.e., the overall scheduling logic of the host processor)communicates an issue slot number via "Slot Select " signal 3403 to all VPESchedule registers disposed in all VPEs within the host processor. Signal 3403 corresponds to a bit position within the VPESchedule registers (which, in the present embodiment, would be one of thirty-two positions). Scheduler 3402 repeatedly circulates signal 3403 through such bit positions, incrementing the position at the occurrence of each issue slot and resetting to the least significant position (i.e., 0) after reaching the most significant bit position (i.e., 31 in the present embodiment).

Referring to FIG. 34, as an example, bit position 1 (i.e., "Slot 1") is being communicated via signal 3403 to all VPESchedule registers within the host processor; i.e., registers 3414 and 3416. Any VPESchedule register with the corresponding bit "set" (i.e., holding a logic 1) signals this fact to the processor scheduler with a "VPE Issue Request" signal. In response, the scheduler grants the subject VPE the current issue slot with a "VPE Issue Grant" signal. Referring again to FIG. 34, VPESchedule register 3414 (of VPE 0) has bit position 1 set and therefore sends VPE Issue Request signal 3415 to Processor Scheduler 3402 which responds with VPE Issue Grant signal 3405.

When a VPE is granted an issue, it employs similar logic at the VPE level. Referring again to FIG. 34, VPE Scheduler 3412 (i.e., the scheduling logic of VPE 0 3406) in response to signal 3405 presents an issue slot number via Slot Select signal 3413 to all ThreadSchedule registers disposed within the VPE. These ThreadSchedule registers are each associated with a thread supported by the subject VPE. Signal 3413 corresponds to a bit position within the ThreadSchedule registers (which, in the present embodiment, would be one of thirty-two positions). Scheduler 3412 repeatedly circulates signal 3413 through such bit positions, incrementing the position at the occurrence of each issue slot and resetting to the least significant bit position (i.e., 0) after reaching the most significant bit position (i.e., 31 in the present embodiment).This slot number is independent of the slot number used at the VPESchedule level.

Referring to FIG. 34, as an example, bit position 0 (i.e., "Slot 0") is being communicated on signal 3413 to all ThreadSchedule registers within the subject VPE; i.e., registers 3418 and 3420. Any thread with a bit set at the selected position of its ThreadSchedule register indicates that fact to the VPE scheduler, and that thread is granted the current issue slot. Referring to FIG. 34, ThreadSchedule register 3418 (of Thread 0) has bit position 0 set and therefore sends Thread Issue Request signal 3419 to VPE Scheduler 3412 which responds with Thread Issue Grant signal 3417 (thereby granting Thread 0 the current issue slot). On cycles where no VPESchedule bit is set for the slot indicated, or where no ThreadSchedule bit is set for the slot indicated, the processor or VPE scheduler will grant the next issue according to some other default scheduling algorithm.

In accordance with the foregoing, , each VPE in a preferred embodiment, for example VPE 0 (3406) and VPE 1 (3404) in FIG. 34, is assigned a VPESchedule Register (format shown in FIG. 24) which permits certain slots, modulo the length of the register's contents, to be deterministically assigned to that VPE. The VPESchedule registers in FIG. 34 are register 3414 for VPE 0 and register 3416 for VPE 1. Those issue slots which are not assigned to any VPE are assigned by implementation-specific allocation policies.

Also in accordance with the foregoing, the slots assigned to threads within a VPE are assigned from the allocation given to that VPE. To give a concrete example, if a processor has two VPEs configured, as is shown in FIG. 34, such that one has a VPESchedule Register containing 0xaaaaaaaa and the other has a VPESchedule Register containing 0x55555555, the issue slots will be alternated between the two VPEs. If a thread on one of those VPEs has a ThreadSchedule Register containing 0x55555555, it will get every other issue slot of the VPE which contains it, which is to say every fourth issue slot of the overall processor.

Thus the value of the VPESchedule register associated with each VPE determines which processing slots go to each VPE. Specific threads are assigned to each VPE, such as Thread 0 and Thread 1 shown in VPE 0. Other threads not shown are similarly assigned to VPE 1. Associated with each thread there is a ThreadSchedule register, for example register 3418 for Thread 0 and register 3420 for Thread 1. The value of the ThreadSchedule registers determines the allocation of processing slots for each Thread assigned to a VPE.

Schedulers 3402 and 3412 may be constructed from simple combinational logic to carry out the functions set out above, and constructing these schedulers will be within the skill of the skilled artisan without undue experimentation, given the disclosure provided herein. They may, for example, be constructed in any conventional way, such as by combinational logic, programmable logic, software, and so forth, to carry out the functions described.

Figure 33:
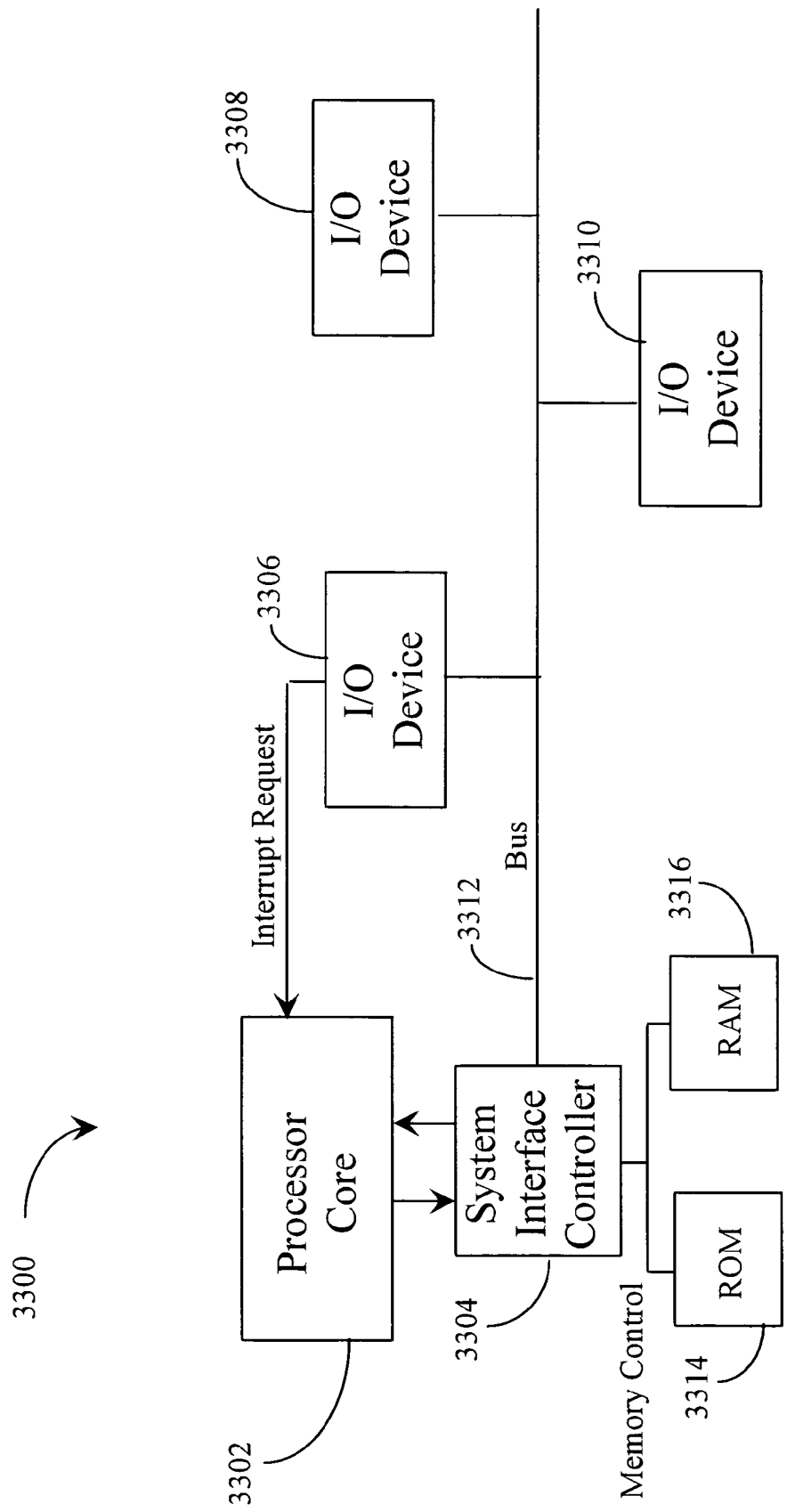
FIG. 33 is a diagram illustrating a computing system in an embodiment of the present invention.

FIG. 33 illustrates a computer system 3300 in a general form upon which various embodiments of the present invention may be practiced. The system includes a processor 3302 configured with the necessary decoding and execution logic (as would be apparent to one of ordinary skill in the art) to support one or more of the instructions described above (i.e., FORK, YIELD, MFTR, MTTR, EMT, DMT and ECONF). In a preferred embodiment, core 3302 also includes scheduling circuit 3400 shown in FIG. 34 and represents the "host processor" as described above. System 3300 also includes a system interface controller 3304 in two-way communication with the processor, RAM 3316 and ROM 3314 accessible by the system interface controller, and three I/O devices 3306, 3308, and 3310 communicating with the system interface controller on a bus 3312. Through application of apparatus and code described in enabling detail herein, system 3300 may operate as a multithreaded system. It will be apparent to the skilled artisan that there may be many alterations to the general form shown in FIG. 33. For example, bus 3312 may take any one of several forms, and may be in some embodiments an on-chip bus. Similarly the number of I/O devices is exemplary, and may vary from system to system. Further, although only device 3306 is shown as issuing an interrupt request, it should be apparent that others of the devices may also issue interrupt requests.

Further Refinements

The embodiment described thus far for fixed 32-bit ThreadSchedule and VPESchedule registers does not allow for allocations of exact odd fractions of issue bandwidth. A programmer wishing to allocate exactly one third of all issue slots to a given thread would have to approximate to 10/32 or 11/32. A further programmable mask or length register in one embodiment allows the programmer to specify that a subset of the bits in the ThreadSchedule and/or VPESchedule Register(s) be used by the issue logic before restarting the sequence. In the example case, the programmer specifies that only 30 bits are valid, and programs the appropriate VPESchedule and/or ThreadSchedule Registers with 0x24924924.

The Multithreading ASE described in this application may, of course, be embodied in hardware; e.g., within or coupled to a Central Processing Unit ("CPU"), microprocessor, microcontroller, digital signal processor, processor core, System on Chip ("SOC"), or any other programmable device. Additionally, the Multithreading ASE may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

A Multithreading ASE embodied in software may be included in a semiconductor intellectual property core, such as a processor core (e.g., embodied in HDL) and transformed to hardware in the production of integrated circuits. Additionally, a Multithreading ASE as described herein may be embodied as a combination of hardware and software.

It will be apparent to those with skill in the art that there may be a variety of changes made in the embodiments described herein without departing from the spirit and scope of the invention. For example, the embodiments described have been described using MIPS processors, architecture and technology as specific examples. The invention in various embodiments is more broadly applicable, and not limited specifically to such examples. Further, a skilled artisan might find ways to program the functionality described above in subtle different ways, which should also be within the scope of the invention. In the teachings relative to QoS the contents of the ThreadSchedule and VPESchedule Registers are not limited in length, and many changes may be made within the spirit and scope of the invention.

Therefore, the invention is limited only by the breadth of the claims that follow.

What is claimed is:

1. A mechanism for assuring quality of service for a context in a digital processor, comprising:
   a first scheduling register dedicated to the context and having N out of M bits set, said bits being indicative of a pattern for assigning instruction issue slots for the context, wherein N and M are integers; and
   a first scheduler that consults the bits sequentially to assign issue slots to the context according to whether a bit is set or not set;
   wherein the first scheduler repeats the pattern of assignments of issue slots after referencing the M bits of the first scheduling register.

2. The mechanism of claim 1 wherein the granularity of scheduling is determined by adjusting a magnitude of M.

3. The mechanism of claim 1 wherein the number of N bits determines the proportion of issue slots assigned to the context.

4. The mechanism of claim 1 further comprising a specific bit in a status register that, if set, exempts the context from processing any interrupt request.

5. The mechanism of claim 1 wherein the first scheduling register is thirty-two bits wide.

6. The mechanism of claim 1 wherein the context is a virtual processing element (VPE) enabled on the digital processor.

7. The mechanism of claim 1 wherein the context is a program thread.

8. The mechanism of claim 6 further comprising:
a thread disposed within the VPE;
a second scheduling register dedicated to the thread; and
a second scheduler that consults the second scheduling register to assign issue slots to the thread.

9. A method for assuring quality of service for a context in a digital processor, comprising the steps of:
(a) dedicating a register as a scheduling register to the context, the register having M bits, wherein M is an integer;
(b) setting N bits of the register in a pattern desired for issuing instructions for the context, wherein N is an integer; and
(c) scheduling issue slots for the context, wherein said scheduling comprises accessing the pattern of bits sequentially, assigning an issue slot to the context according to whether a bit is set or not set, and repeating after reaching the end of the pattern.

10. The method of claim 9 wherein a granularity of said scheduling is adjusted by adjusting a magnitude of M.

11. The method of claim 9 wherein in step (b) specific patterns of execution for the context are constrained by setting or not setting bits of the scheduling register in consecutive positions as blocks, wherein a block is two or more consecutive positions.

12. The method of claim 9 further comprising a step for assigning and setting a specific bit in a status register that, if set, exempts the context from processing any interrupt request.

13. The method of claim 9 wherein the scheduling register is thirty-two bits wide.

14. The method of claim 9 wherein the context is a virtual processing element (VPE) enabled on the digital processor.

15. The method of claim 9 wherein the context is a program thread.

16. The method of claim 9 wherein the digital processor supports multiple virtual processing elements (VPEs) and each VPE supports one or more program threads, the method comprising assigning at least one scheduling register to a VPE and assigning at least one other scheduling register to a program thread in the VPE.

17. A digital processor for supporting and executing multiple contexts, comprising one or more specific scheduling registers dedicated one-to-one with specific ones of the contexts, and having N of M bits set, said bits being indicative of a specific pattern for granting instruction issue slots for a context, and a scheduler configured to access each of said bits sequentially to grant issue slots to the contexts according to whether a bit is set or not set, and repeat the pattern after reaching the end of the pattern.

18. The digital processor of claim 17 wherein granularity of scheduling is determined by adjusting a magnitude of M.

19. The digital processor of claim 17 wherein the number of bits set in an individual scheduling register compared to M determines the proportion of issue slots assigned to one of the multiple contexts, and setting bits of the scheduling register in consecutive positions as blocks allows repetitive block assignment of issue slots.

20. The digital processor of claim 17 wherein a specific bit in a status register is reserved for interrupt service, such that, if set, an associated context is exempted from servicing interrupt requests.

21. The digital processor of claim 17 wherein one or more of the scheduling registers is thirty-two bits wide.

22. The digital processor of claim 17 enabled to support one or more virtual processing elements (VPEs), and the contexts are VPEs.

23. The digital processor of claim 17 wherein the context is a program thread.

24. The digital processor of claim 17 enabled to support multiple virtual processing elements (VPEs) and each VPE is enabled to support one or more program threads, wherein individual ones of the scheduling registers associate with individual VPEs, and an individual one of the scheduling registers supports an individual program thread in a VPE.

25. A processing system for assuring quality of service for a context, comprising:
at least one processor;
a scheduling register accessible to the processor, dedicated to the context and having N of M bits set in a pattern for assigning instruction issue slots for the context, wherein N and M are integers; and
a scheduler that consults the bits sequentially to assign issue slots to the context according to whether a bit is set or not set;
wherein the scheduler repeats the pattern when reaching the end of the pattern.

26. The system of claim 25 wherein granularity of scheduling is determined by adjusting a magnitude of M.

27. The system of claim 25 wherein the number of bits set compared to M determines the proportion of execution slots assigned to the context, and setting bits of the scheduling register in consecutive positions as blocks allows repetitive block assignment of issue slots.

28. The system of claim 25 further comprising a bus system communicating between the digital processor and one or more input/output (I/O) devices, and a specific bit in a status register that, if set, exempts the context from processing any interrupt request from one of the I/O devices.

29. The system of claim 25 wherein the scheduling register is thirty-two bits wide.

30. The system of claim 25 wherein the context is a virtual processing element (VPE) enabled on the at least one processor.

31. The system of claim 25 wherein the context is a program thread.

32. The system of claim 25 wherein the at least one processor supports multiple virtual processing elements (VPEs) and each VPE supports one or more program threads, the mechanism further comprising at least one scheduling register dedicated to a VPE and at least one other scheduling register dedicated to a program thread in the VPE.

33. A digital storage medium having written thereon a software program code set executable on a digital processor, the code set comprising function code for
reading sequentially bits of a register dedicated to a specific context wherein N out of M of said bits are set, said bits being indicative of a pattern for assigning instruction issue slots for the context, wherein N and M are integers, and
scheduling issue slots for the context, wherein said scheduling comprises assigning issue slots to the associated specific context according to whether each bit is set or not set and repeating the pattern after referencing the M bits of the register.

34. The digital storage medium of claim 33 further comprising a function for recognizing one bit of a dedicated status register as a bit to exempt the associated context from servicing an interrupt request.

35. The digital storage medium of claim 33 wherein the context is a virtual processing element (VPE).

36. The digital storage medium of claim 33 wherein the context is a program thread.

37. A computer-readable storage medium to direct the operations of a computer, comprising:
   computer-readable program code for describing a mechanism for assuring quality of service for a context in a digital processor, the program code including:

a first program code segment for describing a scheduling register dedicated to the context and having N out of M bits set, said bits being indicative of a pattern for assigning instruction issue slots for the context, wherein N and M are integers; and a second program code segment for describing a scheduler that consults the bits sequentially to assign issue slots to the context according to whether a bit is set or not set;

wherein the scheduler repeats the pattern of assignments of issue slots after referencing the M bits of the register.

* * * * *